US006385701B1

(12) United States Patent
Krein et al.

(10) Patent No.: US 6,385,701 B1
(45) Date of Patent: May 7, 2002

(54) METHOD, SYSTEM AND PROGRAM PRODUCTS FOR SHARING DATA BETWEEN VARIED CLIENTS USING TOKEN MANAGEMENT

(75) Inventors: Timothy Peter Krein, Endicott; Scott Thomas Marcotte, Vestal, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/443,727

(22) Filed: Nov. 19, 1999

(51) Int. Cl.$^7$ ............................................. G06F 12/00
(52) U.S. Cl. .......................... 711/141; 711/120; 707/8
(58) Field of Search ...................... 711/120, 141–147, 711/108; 707/8

(56) References Cited

U.S. PATENT DOCUMENTS

| | | | |
|---|---|---|---|
| 5,175,852 A | 12/1992 | Johnson et al. | 707/8 |
| 5,202,971 A | 4/1993 | Henson et al. | 707/8 |
| 5,530,905 A | 6/1996 | Nichols et al. | 709/227 |
| 5,535,375 A | 7/1996 | Eshel et al. | 703/27 |
| 5,606,719 A | 2/1997 | Nichols et al. | 710/56 |
| 5,634,122 A | 5/1997 | Loucks et al. | 707/8 |
| 5,644,751 A | 7/1997 | Burnett | 711/113 |
| 5,689,701 A | 11/1997 | Ault et al. | 707/10 |
| 5,708,792 A * | 1/1998 | Hayes et al. | 711/108 |
| 5,764,887 A | 6/1998 | Kells et al. | 713/200 |
| 5,838,916 A | 11/1998 | Domenikos et al. | 709/219 |

OTHER PUBLICATIONS

"File System Request Reflection Within The OS/2 Client," IBM Technical Disclosure Bulletin, vol. 38, No. 05, May 1995, pp. 609–610.
"Establishing Distributed File System Access to MVS Host Files," IBM Technical Disclosure Bulletin, vol. 38, No. 04, Apr. 1995, pp. 39–40.

* cited by examiner

Primary Examiner—Do Hyun Yoo
Assistant Examiner—Nasser Moazzami
(74) Attorney, Agent, or Firm—Blanche E. Schiller, Esq.; Arthur J. Samodovitz, Esq.; Heslin Rothenberg Farley & Mesiti P.C.

(57) ABSTRACT

In a computing environment having clients with different semantics or protocols, a capability is provided that enables those clients to share the same data or files. A token management function is provided that allows clients that did not previously support token management to use the token management function to access the shared files. These capabilities are provided without requiring modifications to the client software.

97 Claims, 15 Drawing Sheets

METHOD, SYSTEM AND PROGRAM PRODUCTS FOR SHARING DATA BETWEEN VARIED CLIENTS USING TOKEN MANAGEMENT

CROSS-REFERENCE TO RELATED APPLICATIONS

This application contains subject matter which is related to the subject matter of the following applications, each of which is assigned to the same assignee as this application. Each of the below listed applications is hereby incorporated herein by reference in its entirety:

"Method, System And Program Products For Managing Thread Pools Of A Computing Environment To Avoid Deadlock Situations," Doolittle et al., Ser. No. 09/443,202, filed Nov. 18, 1999.

TECHNICAL FIELD

This invention relates, in general, to data sharing and, in particular, to the sharing of data among a variety of different clients.

BACKGROUND ART

A file server, such as a Unix file server, may support many different file serving protocols, including a Network File System (NFS) protocol, a Server Message Block (SMB) protocol, which is also known as the Common Internet File System (CIFS), a Distributed File Services protocol for the Distributed Computing Environment (DFS/DCE), and an Andrew File System (AFS) protocol. Although many different protocols may be supported, each of the protocols uses a different means of communication between the client and the server and requires different software depending on the type of client machine.

Further, although there may be various protocols, some of the protocols are compliant with the protocols of the server, while others are not. When the client protocols are not compliant with the server protocols, the client cannot share the same data files with other clients that have compliant protocols, since the integrity of the data is jeopardized. Thus, the non-compliant client uses separate data files.

The use of separate data files increases cost, storage usage and complexity. Thus, a need exists for a capability that enables clients having differing protocols to share the same files. A further need exists for a capability that enables non-compliant clients to access the same files as other compliant clients.

SUMMARY OF THE INVENTION

The shortcomings of the prior art are overcome and additional advantages are provided through the provision of a method of sharing data within a computing environment. In one instance, the method includes caching data in a first cache of the computing environment using a first protocol; caching at least a portion of the data in a second cache of the computing environment using a second protocol, the second protocol being different from the first protocol; and providing cache consistency between the first cache and the second cache, wherein a change of data common to the first cache and the second cache is reflected in the first cache and the second cache.

In one embodiment, the first protocol includes using at least one opportunistic lock to cache data in the first cache. In a further embodiment, the caching of the data in the first cache includes obtaining at least one token to represent the at least one opportunistic lock.

In a further aspect of the present invention, a method of sharing data between clients of a computing environment is provided. The method includes, for instance, accessing a file by a first client of the computing environment, the first client having a first protocol; and accessing the file by a second client of the computing environment, the second client having a second protocol. The second protocol is different from the first protocol, and wherein a change to the file by one of the first client and the second client is reflected to the other of the first client and the second client, thereby providing cache consistency.

In one example, the accessing of the file by the first client and the second client does not require software changes to the first client and the second client. In yet a further example, the accessing of the file by the first client and the second client does not require changes to an operating system of a server managing the first client and the second client.

In yet another example, at least one client of the first client and the second client is remote from a server of the computing environment, and wherein the method further includes obtaining at least one token right from a server token cache for one or more of the at least one client to be used in accessing the file.

In another aspect of the present invention, a method of managing tokens within a computing environment is provided. The method includes, for example, providing a server token cache at a server of the computing environment, the server token cache including one or more tokens; and obtaining at least one token from the server token cache for a remote client of the computing environment.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with one aspect of the present invention, data is shared between various clients having different semantics or protocols. For example, data is shared amongst Server Message Block (SMB) clients, (e.g., Windows, OS/2 clients), local users and/or remote Unix clients, such as Distributed File Services for the Distributed Computing Environment (DFS/DCE) clients. In one example, the data is shared using token management techniques.

Figure 1:
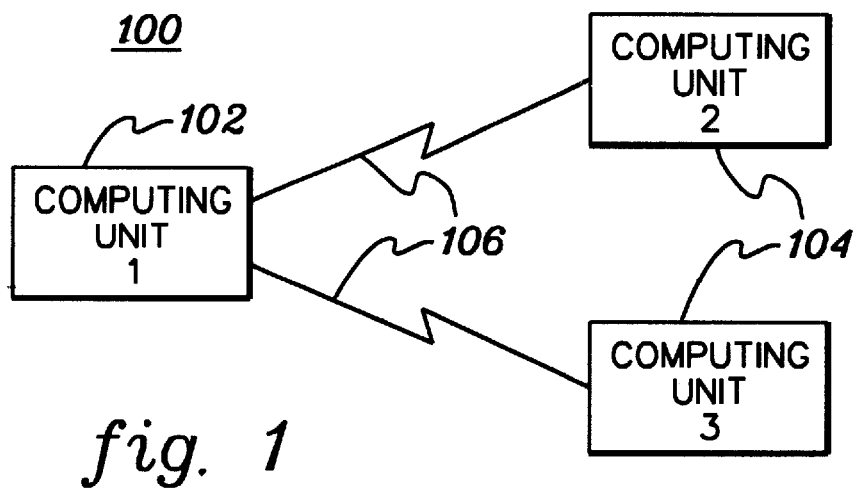
FIG. 1 depicts one example of a computing environment incorporating and using the various aspects of the present invention.

One embodiment of a computing environment incorporating and using the capabilities of the present invention is described with reference to FIG. 1. A computing environment 100 includes, for instance, at least one computing unit 102 coupled to one or more other computing units 104. In one example, computing unit 102 is a server, while computing units 104 are clients. Each unit includes, for example, one or more central processing units, memory and one or more input/output devices, as is well known in the art.

Computing unit 102 is based, for instance, on the Enterprise Systems Architecture (ESA)/390 offered by International Business Machines Corporation, Armonk, N.Y ESA/390 is described in an IBM publication entitled "Enterprise Systems Architecture/390 Principles Of Operation," IBM Publication No. SA22-7201-04, June 1997, which is hereby incorporated herein by reference in its entirety. One example of a computing unit based on ESA/390 is the 9672 Parallel Enterprise Server offered by International Business Machines Corporation.

One or more of computing units 104 are personal computers. As one example, computing unit 104 is a personal computer executing Microsoft Windows Which runs on the Intel PC architecture. In one instance, one or more of computing units 104 include Server Message Block (SMB)/Common Internet File System (CIFS) Clients. Further, one or more of computing units 104 may include a Distributed Computing Environment (DCE)/Distributed File Services (DFS) client.

Computing unit 102 is coupled to one or more of computing units 104 via a standard connection 106, such as any type of wire connection, token ring, ethernet or other connection, to name just a few examples. One communications protocol used by one or more of these connections is TCP/IP.

The above-described computing environment and/or computing units are only offered as examples. The present invention can be incorporated and used with many types of computing units, computers, processors, nodes, systems, workstations and/or environments without departing from the spirit of the present invention. For example, one or more of the units may be based on the Unix architecture or may include the Intel PC architecture. Additionally, while some of the embodiments described herein are discussed in relation to server and clients, and in particular to a file server and clients, such embodiments are only examples. Other types of receivers and senders of information, other types of servers, clients and/or other types of computing environments can benefit from the present invention and are thus, considered a part of the present invention.

Additionally, in various aspects of the present invention, the clients need not be remote from the server. Various aspects of the present invention are equally applicable to clients and servers running on the same physical machine, different physical machines or any combination thereof. As used herein, the term client can refer to either a local user or a remote client.

Figure 2:
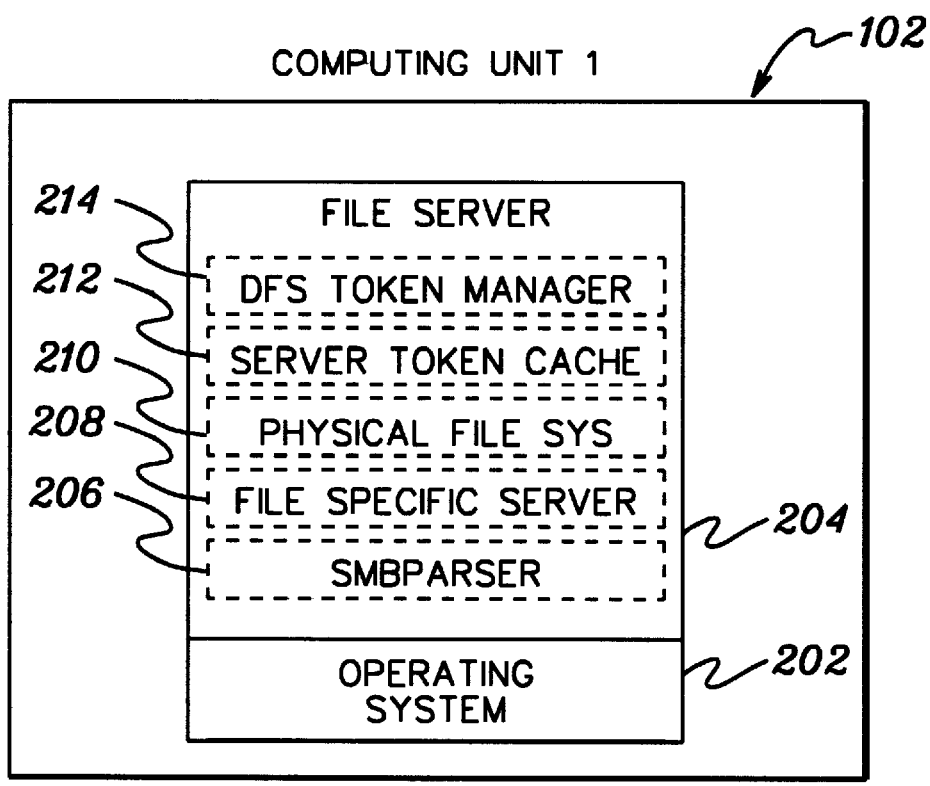
FIG. 2 depicts further details of a computing unit of FIG. 1, in accordance with the principles of the present invention.

Further details of computing unit 102 are described with reference to FIG. 2. In one example, computing unit 102 includes an operating system 202, such as the OS/390 or MVS Operating System offered by International Business Machines Corporation. Running on the operating system is, for instance, a file server 204. As one example, file server 204 is an OS/390 Unix Distributed File Services (DFS) server. File server 204 includes a plurality of layers, such as, for instance, an SMBparser layer 206, a file specific server (filess) layer 208, a physical file system layer 210, a server token cache 212, and a DFS token manager layer 214. Although each of the layers is shown as part of the file server, one or more of the layers can be coupled to the file server. Thus, the layers are considered associated with the file server, as well as with the computing unit.

SMBparser layer 206 is the main SMB processing layer that knows the state of the environment relative to the client (e.g., what files are open, etc.) When this layer is called, the client session is in a stopped state. Thus, no more requests are received from the client while it is in this state. The lowest SMB layers (e.g., Netbios and an Async Sockets I/O layer, not shown) are used to re-enable the session after performing some preliminary processing.

File specific server layer 208 is the layer that transforms SMBparser requests into cache and physical file system requests and also interfaces with the DFS token management service to manage the sharing of files between clients.

Physical file system 210 is the layer of the file server used to write information to and/or read information from the storage media (such as, for instance, disks) coupled to the physical file system. In one example, the physical file system retrieves information from a cache associated therewith and writes that information to the storage media. As a further example, the physical file system retrieves information from the storage media, places it in its cache, and then forwards it to the requesters of that information.

Server Token cache 212 is a server cache that caches tokens obtained from the central DFS token manager for remote clients, such as SMB clients. These are the tokens to be used by the clients to perform operations and to access files, as described in further detail below.

DFS token manager 214 is the layer of the file server used to manage the tokens needed by the clients to access files. For example, DFS/DCE clients obtain tokens before performing an operation locally. That is, they use tokens to allow them to cache data, status and byte range locks without requiring a communication (e.g., a remote procedure call (RPC)) with the server; thus, reducing network traffic and increasing the access speed to remote files. A token represents a client's right to cache the data and it may represent its right to perform an operation.

DFS/DCE client software provides caches of files and directories to avoid network traffic. Additionally, they cache byte range locks, file opens and closes. To facilitate this, a token management scheme is used. If a client has a token with the needed rights for a file or directory, it can cache the data for that file or directory. It obtains these tokens from the central token manager (e.g., DFS token manager 214) residing at the file server.

The clients also cache tokens, since a later operation by a user on that client machine may later refer to that file. Thus, tokens which allow for file or directory caching are themselves cached to avoid sending RPC calls to the remote token manager to re-obtain them. When the token manager needs to reclaim a token from a client, it does so by issuing a token revoke RPC to the client and the client is expected to respond with an affirmative or negative indication on whether the token manager can have a token back.

Associated with a token are token rights, which are the set of operations allowed to be performed and cached at the client that holds the token. Thus, a single token could allow many types of rights. In one example, there are four classes of rights including, for instance, data rights that allow the client to read or write data and cache the data locally; status rights that allow the client to read or update a file's status (or metadata) and cache status locally; open rights that allow the client to open the file on behalf of a local user; and lock rights that allow the client to byte range lock a file on behalf of a local user and cache local byte range locks. For example, if a client has a byte range lock token, it can cache many byte range lock requests made by various user processes on that machine.

Each of the above classes of rights include read and write forms. For example, there are DATA_READ, DATA_WRITE, STATUS_READ, STATUS_WRITE, OPEN_READ, OPEN_WRITE, LOCK_READ and LOCK_WRITE. Read rights allow read file operations and write rights allow write or update file operations. Additionally, there is an OPEN_DELETE right that is used only at the server, so it can be notified when the last client is done with a file pending delete at the server. Further, LOCK and DATA rights are byte range tokens. They can be obtained for a given range of bytes for a file, not just for the whole file.

Not all tokens are compatible. For example, LOCK_WRITE conflicts with LOCK_READ and LOCK_WRITE over the same byte range, if held by separate clients, since a user cannot usually get a byte range lock of a file in write mode if it is locked read, or vice-versa. However, a single client can hold conflicting tokens (such as LOCK_READ and LOCK_WRITE), but different clients cannot hold conflicting tokens for the same file. For example, Client A can have both the LOCK_READ and LOCK_WRITE for File X, but Client A cannot have the LOCK_READ on File Y, if Client B has the LOCK_WRITE on File Y. DATA_WRITE is not compatible with DATA_READ or DATA_WRITE; OPEN READ and OPEN_WRITE are compatible; and STATUS_READ is not compatible with STATUS_WRITE.

When tokens conflict, the central token manager runs revoke processing and sends an RPC back to a client and asks for the tokens back. The client then stores any dirty data and gives back the tokens as soon as it can. A client may not be able to return certain tokens immediately, which is the case for OPEN or LOCK rights, since they represent user file opens and byte range locks and cannot be returned until a user no longer has the file open or locked. But the client will remember that a revoke was requested and return the tokens as soon as it can.

In addition to the above, there is a piece of code running in the Unix kernel called the "glue" that replaces the local server vnode (file) operations with ones that are part of the DFS product. These operations obtain and return tokens on behalf of local users. By obtaining tokens on behalf of local users, remote client caches will get token revokes, if a local user is performing a conflicting operation against a file cached by a remote user. When a client sees the token revoke from the server, it can invalidate its cache and/or store back any dirty file data and return its token rights for the file.

In accordance with the principles of the present invention, token management is provided for a variety of clients, including remote DFS!DCE clients, local users, and other clients that traditionally were not supported by token management, including, but not limited to, SMB/CIFS clients. The manner in which SMB/CIFS clients, as one example, are supported is described in detail herein.

In one embodiment, each client is represented by a data structure that provides information relating to the client. In particular, there is a data structure for each remote client, and a data structure for all (or a subset thereof) of the local users combined. As one example, the data structure is referred to as a host data structure (hs_host), which is described below with reference to FIG. 3a.

In addition to the hs_host data structure, a generic host structure 304 (FIG. 3b) is provided that is a global host structure used to represent SMB/CIFS clients. Thus, an SMB/CIFS client, as one example, is represented by two hosts, a specific host and a generic host. The generic host is used to reduce the occurrences of token conflicts, as explained below.

Figure 3A:
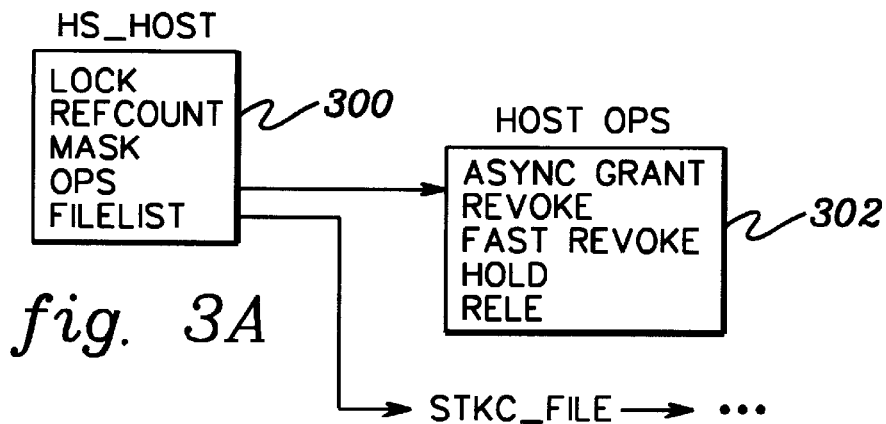
FIGS. 3a–3c depict various data structures used in accordance with the principles of the present invention.
Figure 3B:

One embodiment of a host data structure is described with reference to FIG. 3a. An hs_host data structure 300 has a number of fields, including, for instance, a lock field used for serialization purposes; a reference count (refcount) used to indicate when the host structure is referenced (when the count is zero, the structure can be freed); a mask that indicates the type of tokens that a particular client wants returned on an optimistic grant (an optimistic grant allows a client requesting a token to ask the token manager to give all the rights it can, in addition to the rights requested); an ops field that points to a vector of functions included in a host ops structure 302; and a filelist field that points to one or more STKC_file structures used to represent files of the client associated with the host.

In one example, host ops structure 302 is a vector of function addresses specific to the type of client the host represents. In one example, the host operations include an async grant, which allows a client to specify that it wants a token, and if it is not available, to be called when it becomes available; a revoke operation used to get a token back from a particular client; a fast revoke operation, which allows the token manager to probe the host to see if the host can answer (positively or negatively) the revoke immediately, as explained in further detail below; a hold operation which increments the refcount when the structure is referenced; and a rele operation, which decrements the refcount.

Figure 3C:
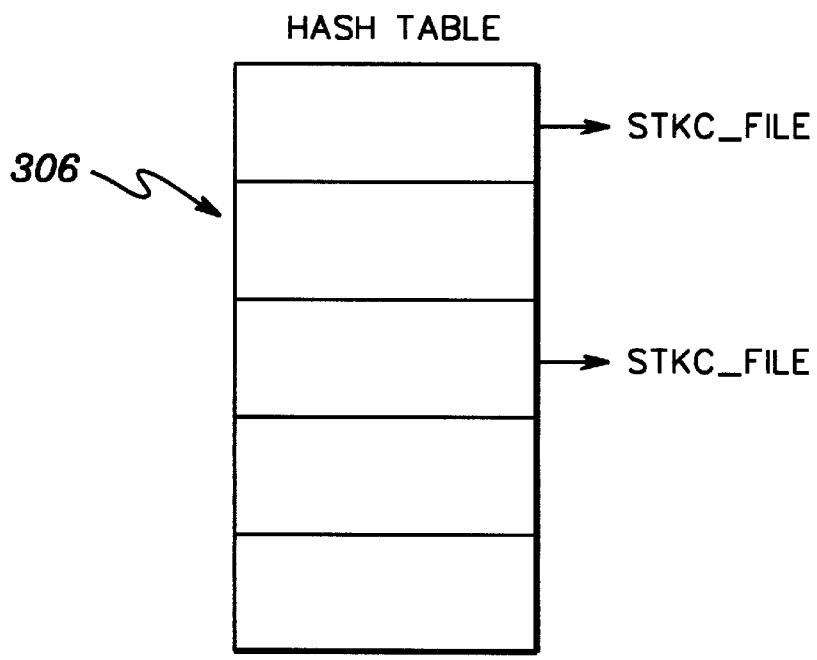
Figure 4:
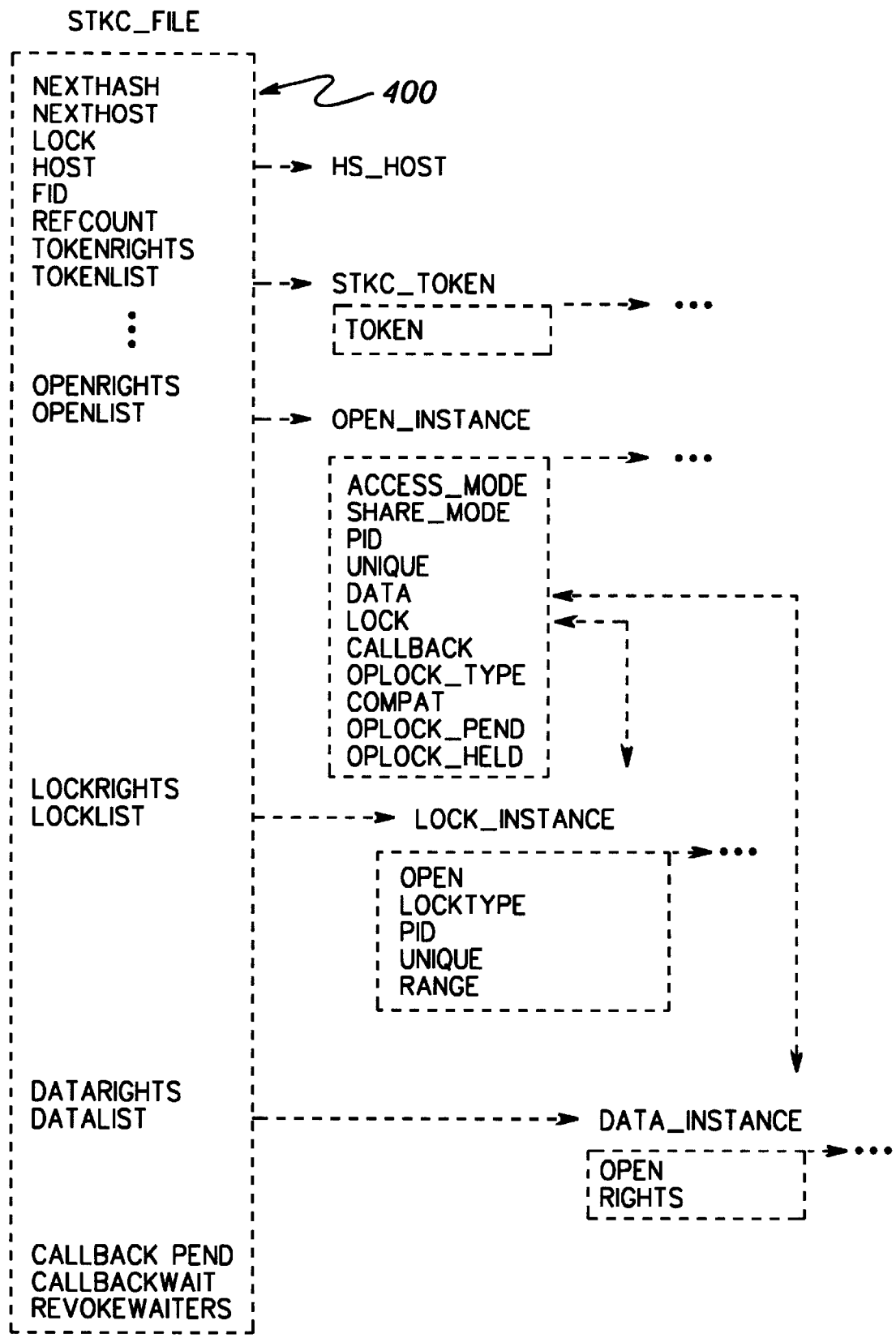
FIG. 4 depicts one example of a data structure representing a file system object (e.g., a file or a directory), in accordance with the principles of the present invention.

The STKC_files referenced by filelist of hs_host 300 are maintained, for instance, by a global hash table 306 (FIG. 3c). That is, each entry of the hash table points to an STKC_file. STKC_files and tokens held for SMB/CIFS clients are linked to which host holds the tokens. Therefore, an STKC_file represents a host/file pair and represents tokens and other information held by a particular client for a particular file. One example of an STKC_file is described with reference to FIG. 4.

An STKC_file structure 400 includes a plurality of fields used to provide information associated with a particular file and the client holding that file. These fields include, for instance, a NextHash field pointing to the next file in hash table 306; a NextHost field pointing to the next file on the host; a lock field providing serialization for the STKC_file; a host field identifying the associated hs_host structure; an FID field identifying the file; a refcount indicating the number of current references to the file; a token rights field indicating the currently held token rights for the file; a token list pointing to a list of one or more tokens; an open rights field indicating the currently held open-based rights for the file; an open list referring to one or more open_instances representing current open files for users of the client; a lock rights field representing the currently held lock rights for the file; a lock list pointing to one or more lock_instances, which represent byte range locks made on the file by the client; a data rights field indicating the currently held data rights by the client; a data list referring to one or more data_instances that represent the data and status token rights needed by the client to cache data remotely (e.g., oplocks) or to perform an operation at the server (such as rename, delete, etc.); a callback pending field indicating whether a callback is pending; a callback wait field indicating whether the client is waiting for a callback; and a revokewaiters field indicating if a revoke is waiting for the tkset holder (described below).

Each of the instance lists described above represents holds on the rights associated with that list and includes one or more fields that represent the particular list. For example, open_instance includes an access mode identifying the requested access (e.g., read, write); a share mode indicating whether multiple processes of the client can be sharing the same file; a PID identifying the process of the client accessing the file; a unique field identifying a file handle provided by filess; a data field representing a pointer to a data instance; a lock field representing a pointer to a lock instance (if data and lock are both zero, the file is not oplocked); a callback field indicating a pending callback; an oplock_type indicating the type of op-lock (described below); a compat field specifying whether this is a compatibility-type open; an oplock_pend field indicating that an oplock is granted, but waiting for DoneOpen (described below) to determine if it should be marked as held; and an oplock_held field indicating whether an oplock is fully held.

In addition to the above, a lock_instance includes, for instance, an open field pointing to an open_instance; a lock type indicating the type of lock (e.g., read, write or both); a process identifier (PID) of the client process; a unique field providing a handle to the filess layer; and a range field indicating the byte range to be locked.

Further, a data_instance includes, in one example, an open field pointing to an open_instance; and a rights field indicating whether it is DATA_READ, DATA_WRITE, STATUS_READ and/or STATUS_WRITE.

When a client, such as an SMB/CIFS client, wishes to perform an operation on a file, the file is first opened. The open specifies the type of access mode requested, such as read (OPEN_READ), write (OPEN_WRITE), read/write. Further, for SMB/CIFS clients, the open also allows the specification of sharing modes that are designed to allow an application control over whether other applications can open the file for read or write, while that application still has the file open. These share modes include, for instance, DENY_ALL (deny any other process from opening the file); DENY_WRITE (deny other processes from opening the file in a write mode)d DENY_READ (deny other processes from opening the file in a read mode); DENY_NONE (deny nobody).

There are also other token rights, referred to as OPEN_DENY_READ and OPEN_DENY_WRITE. The OPEN_DENY_READ conflicts with OPEN_READ and OPEN_DENY_WRITE conflicts with OPEN_WRITE. In one embodiment, the token manager handles these new modes, but the mask in the host structure is referred to by the token manager, so it does not give these rights (or other rights) out for optimistic grants to hosts that do not understand them, such as non-SMB hosts. Thus, when an SMB client, for instance, opens a file in a share mode other than DENY_NONE, the needed OPEN_DENY tokens are obtained, along with the OPEN_READ and/or OPEN_WRITE tokens to ensure first that this client can even open the file (another client might be denying the open). If the open is allowed, then the OPEN_DENY tokens are used to allow for notification, if another client attempts to open the file. If the client that originally opened the file in the deny mode still has the file opened, then a token revoke can be denied, and hence, a file access denied.

Additionally, in some applications there is a compatibility mode open that in effect allows DENY_WRITE sharing if the process is opening the file for read, and DENY_ALL sharing, if the process is opening the file for a write access. If an application specifies DENY_WRITE or DENY_ALL upon its open and successfully opens the file, then that application can cache its own data for the file (outside of the client SMB redirector caches), which means that in order to ensure proper file sharing semantics for SMB clients, the SMB server is to support the different share modes.

At file open, certain clients, such as SMB/CIFS clients, obtain opportunistic locks (oplocks) to control file caching on client machines. If the server grants an oplock, the client can cache file data and byte range lock requests, and can perform read-ahead or write-behind operations. Thus, it is the server's responsibility for determining whether an oplock can be granted or refused. A file open request could still succeed in opening the file, but fail to get an oplock, which means the client should not cache data. Opportunistic locking protocols are different depending on the level of the SMB protocol. SMB is an evolving protocol, which has several versions, called dialects that a client or server can support. Clients and servers negotiate the dialect when the client first connects to the server.

One dialect is referred to as the Lanman 2.1 dialect. At this dialect level there is only one type of oplock (simply called oplock). A client can be granted an oplock at this dialect level, if there are no other open instances of that file. Hence, it is the only process anywhere that has the file open. If another process attempts to open the (be it on the same machine or a different machine), the oplock is to be broken. When an oplock is broken, the server sends a Service Message Block (SMB) to the client to tell it that its oplock is being broken, the client flushes any dirty file data and obtains any needed locks, and then either closes the file or acknowledges the oplock break via an SMB called a lockingX SMB. Once an oplock is broken, the server could possibly hand out the oplock to another opener, if the prior oplock holder closed the file. If it responded to the oplock break, but did not close the file, then another oplock on the same file is not granted.

Another dialect is referred to as the NT 0.12 dialect. At this dialect (which is CIFS compatible) and later, there are three types of oplocks. Oplocks are still requested at file open time, and may or may not be granted by the server. For any given open instance, the client can have only one type at a given time. The three types include, for instance, Exclusive, Level 2 and Batch, each of which is described below:

1. Exclusive: This is similar to pre-CIFS style oplocks (i.e., Lanman 2.1 oplocks). However, share modes are examined before attempting an oplock break (a share mode preventing another open simply fails the subsequent open and does not break the oplock, unlike pre-CIFS style, which always breaks the oplock first).

2. Level 2. This mode allows a client to cache file read data, but not byte range locks. It is not requested on an open, but is usually a downgrade of an Exclusive. For example, if a client has an Exclusive oplock on a file and the server detects another client/process opening the file, but that client/process will not write to the file, the Exclusive oplock could be downgraded to a Level 2 oplock via an oplock break request from the server. In this case, the client responds in much the same way, but the client can continue to at least cache file data (for read). If a Level 2 oplock is broken, then the client does not need to respond, since it has no byte range locks or dirty data.

3. Batch: This mode is beneficial when running .BAT files, for example. It allows caching of file opens and file data at the client, and thus, would be good when running .BAT files, which are repeatedly opened, read and closed. The server breaks the oplock, if another tries to open, rename, or delete the file. Hence, it's similar to pre-CIFS, except that its mainly used for file open and read caching.

Further details regarding open file processing, including open file processing for an SMB/CIFS client, is described with reference to FIGS. 5–7. This discussion includes how tokens are obtained for oplocks, in accordance with one aspect of the present invention.

In one example, an oplock has three phases including, for instance: file open; a whole file byte range lock (if the type of oplock allows byte range lock caching); and obtaining the appropriate data and status token rights. The open_instance lock_instance and data_instance are linked, in one embodiment, to be able to determine during revoke processing whether the token revoke will need an oplock callback. In order to avoid a deadlock, the three phases are performed in a predefined order, starting with open, proceeding to lock and then to data/status. Therefore, if tokens need to be obtained from the central token manager, the open rights are requested first, then a byte range lock is later placed on the file by asking for a whole file byte range lock token from the central token manager, and finally, data and status holds are placed on the file by obtaining the appropriate data/status tokens. Since tokens are obtained in this order, there is no deadlock, if two separate clients are attempting an oplock on the same file at the same time. This also provides the appropriate ordering relative to individual file operations. For example, an individual file operation determines if it is permitted, which includes obtaining a byte range lock token, and then performs the operations after obtaining the data/status token.

In one aspect of the present invention, an oplock is obtained in a non-atomic process. That is, it involves separate states, and an oplock is not considered granted if, for example, the reply to the SMB open call fails or some other error occurs after an oplock is initially granted. Hence, open processing is a two stage event where a HandleOpen routine is called to open the file and a DoneOpen routine is called to indicate if the file was successfully opened in the physical file system.

One embodiment of the logic associated with a HandleOpen routine is described with reference to FIG. 5. The logic associated with the HandleOpen routine, as well as the other routines described herein, are performed by the server. The HandleOpen routine is itself a multistage routine, since it obtains tokens in open, lock and data/status order. It also has code to detect thrashing and the possible need to prevent grant of an oplock. In one example, the input to the handle open routine includes a file id (FID), the access/share modes, and the oplock desired.

Figure 5:
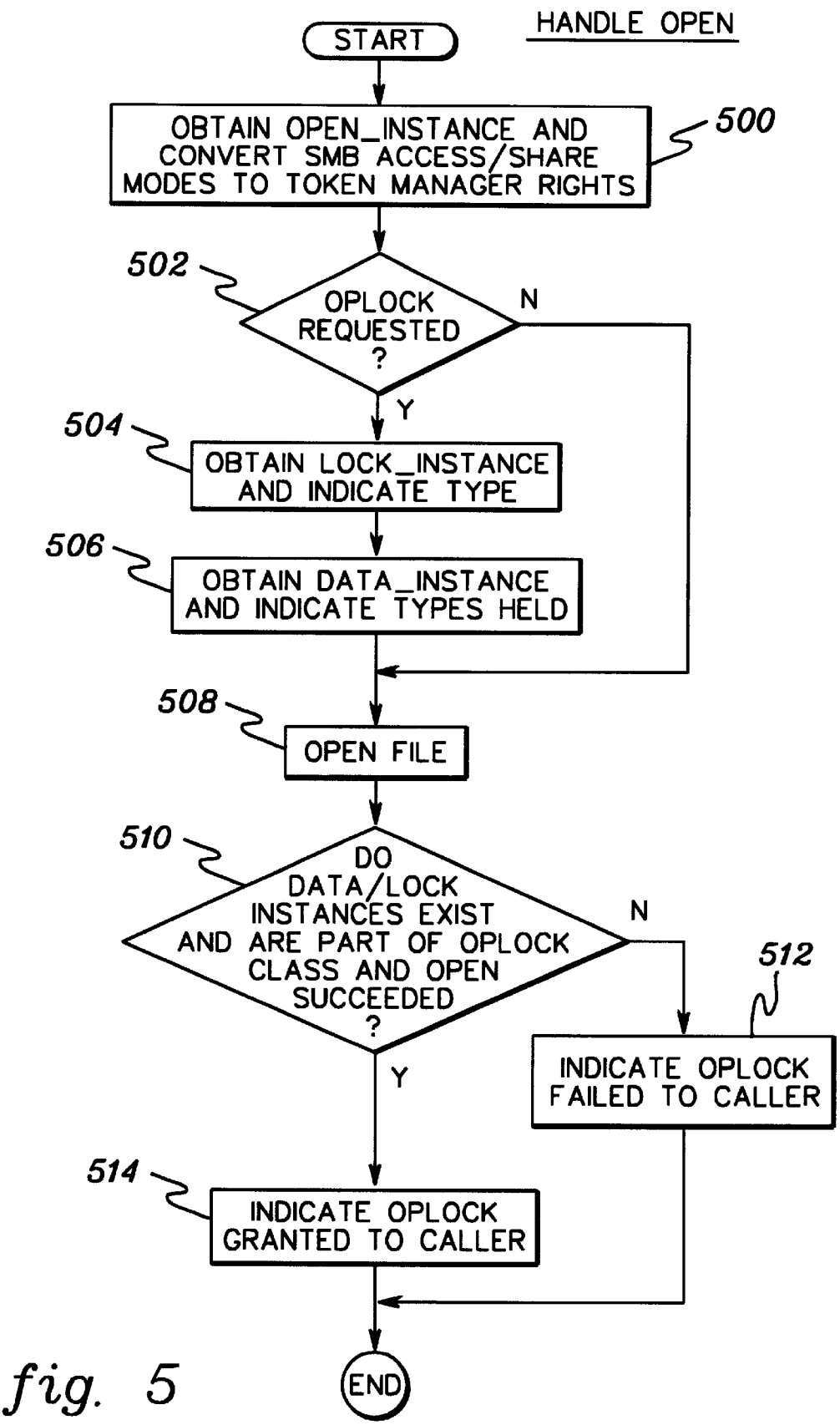
FIG. 5 depicts one embodiment of the logic associated with open file processing, in accordance with the principles of the present invention.

Referring to FIG. 5, initially, an open_instance structure is obtained to represent the type of open and the sharing modes requested. Additionally, the SMB access/share modes are converted (e.g., mapped) to token manager rights (e.g., OPEN_READ, OPEN_DENY_READ, OPEN_WRITE, OPEN_DENY_WRITE), STEP 500.

Subsequently, a determination is made as to whether an oplock was requested, STEP 502. This determination is made by checking, for instance, the input to the routine. If an oplock was requested, then a lock_instance is obtained for a whole file lock, and the type of lock is indicated based on the open access mode, STEP 504. For example, the type may include LOCK_READ, LOCK_WRITE, or both LOCK_READ and LOCK_WRITE depending on the requested access mode, and this indication is stored in locktype of the lock_instance. In addition to obtaining the lock_instance, a data_instance is obtained for a whole file and the types held are indicated, STEP 506. In one example, these types may include DATA_READ, DATA_WRITE, STATUS_READ and/or STATUS_WRITE, and are stored within the rights field of data_instance. The data_instance and lock_instance contain the information for an oplock, if any, and are linked together to form an oplock class.

Subsequent to obtaining the lock and data instances, or if an oplock was not requested, then the requested file is opened, STEP 508. The file is opened using, for instance, an OpenFile routine, one embodiment which is described with reference FIGS. 6a–6c.

Figure 6A:
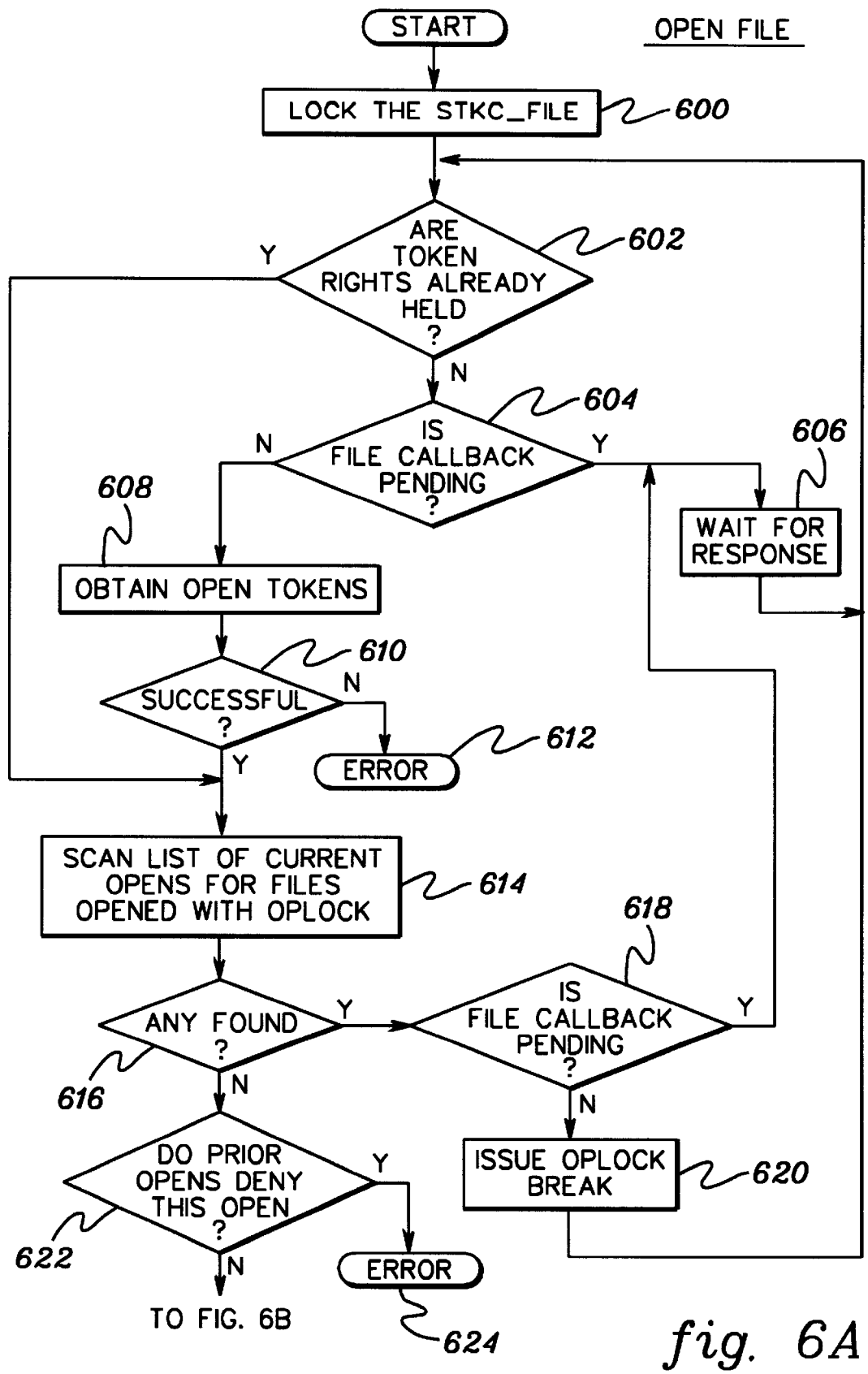
FIGS. 6a–6c depict one embodiment of the logic associated with opening a file, in accordance with the principles of the present invention.
Figure 7:
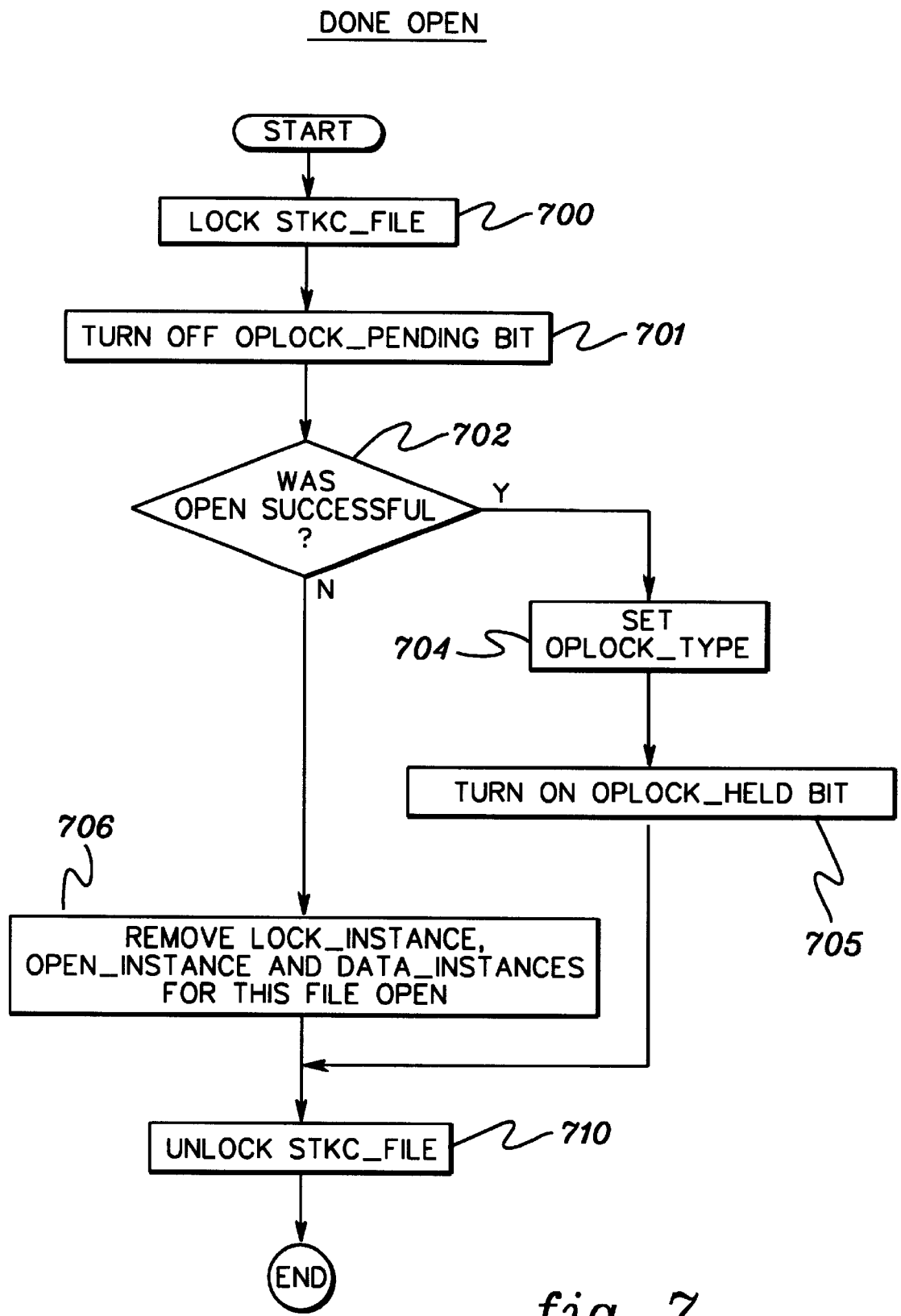
FIG. 7 depicts one embodiment of the logic associated with completing the open processing of FIGS. 5 and 6a–6c, in accordance with the principles of the present invention.

Referring to FIG. 6a, initially, the STKC_file for the client is locked, STEP 600 (FIG. 6a). In particular, the OpenFile processing generally runs its code while holding a lock on the STKC_file. However, the general practice is to not hold this lock when calling the central token manager nor when sending oplock break callbacks to clients, since these may take a long time. Also, deadlock is avoided, since no locks are held over calls to external components.

Thereafter, a determination is made as to whether token rights are already held, INQUIRY 602. Since tokens are cached for some clients (e.g., SMB/CIFS clients), a token with the desired open rights may already exist. This determination is made by, for instance, checking the TokenRights field of STKC_file or by checking each STKC_TOKEN of the token list. If token rights are not held, then a further determination is made as to whether a file callback is pending, INQUIRY 604. Again, this determination is made by checking the callback pending field of STKC_file. If a file callback is pending, then there is a wait for the response, STEP 606, and processing continues with INQUIRY 602.

Returning to INQUIRY 604, if there is no file callback pending, then the token manager is called to obtain a token with the desired open rights, STEP 608. Token processing is described in further detail below. Thereafter, a determination is made as to whether the token was obtained successfully, INQUIRY 610. If it was not obtained successfully, then another client has deny modes preventing this open and thus, an error is returned, STEP 612. On the other hand, if the token was obtained successfully, or if token rights are already held, then the list of current opens is scanned for any files that are opened with oplock, STEP 614.

If there are any current opens for files opened with oplock, INQUIRY 616, then a determination is made as to whether a file callback is pending, INQUIRY 618. Once again, if a callback is pending, then there is a wait for a response, STEP 606, and processing then continues with INQUIRY 602. However, if there is not a callback pending, then an oplock break is issued, STEP 620. In one example, an oplock break SMB is sent to the client to break the oplock. Processing then continues with INQUIRY 602.

Figure 6B:
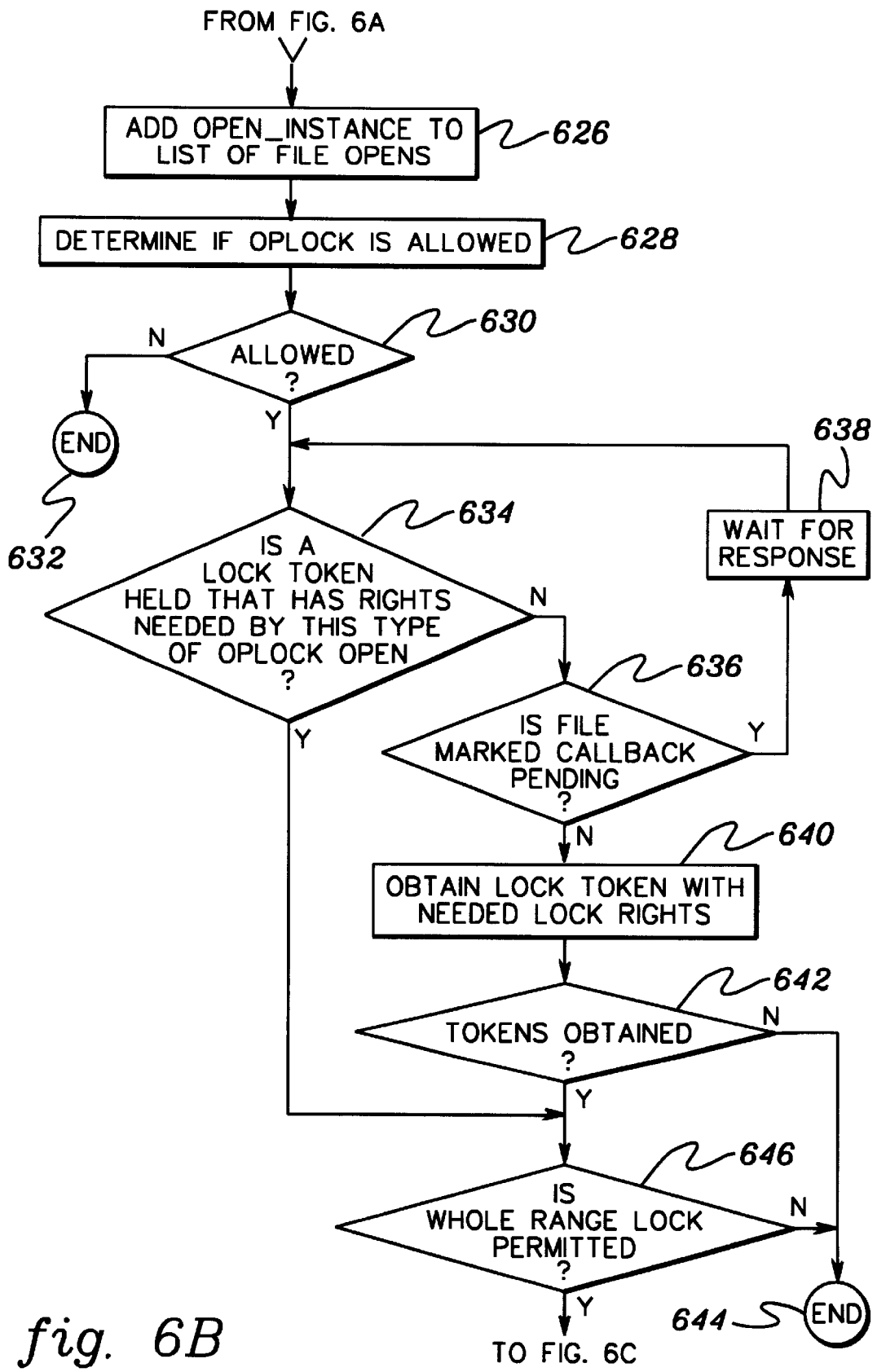
Figure 6C:
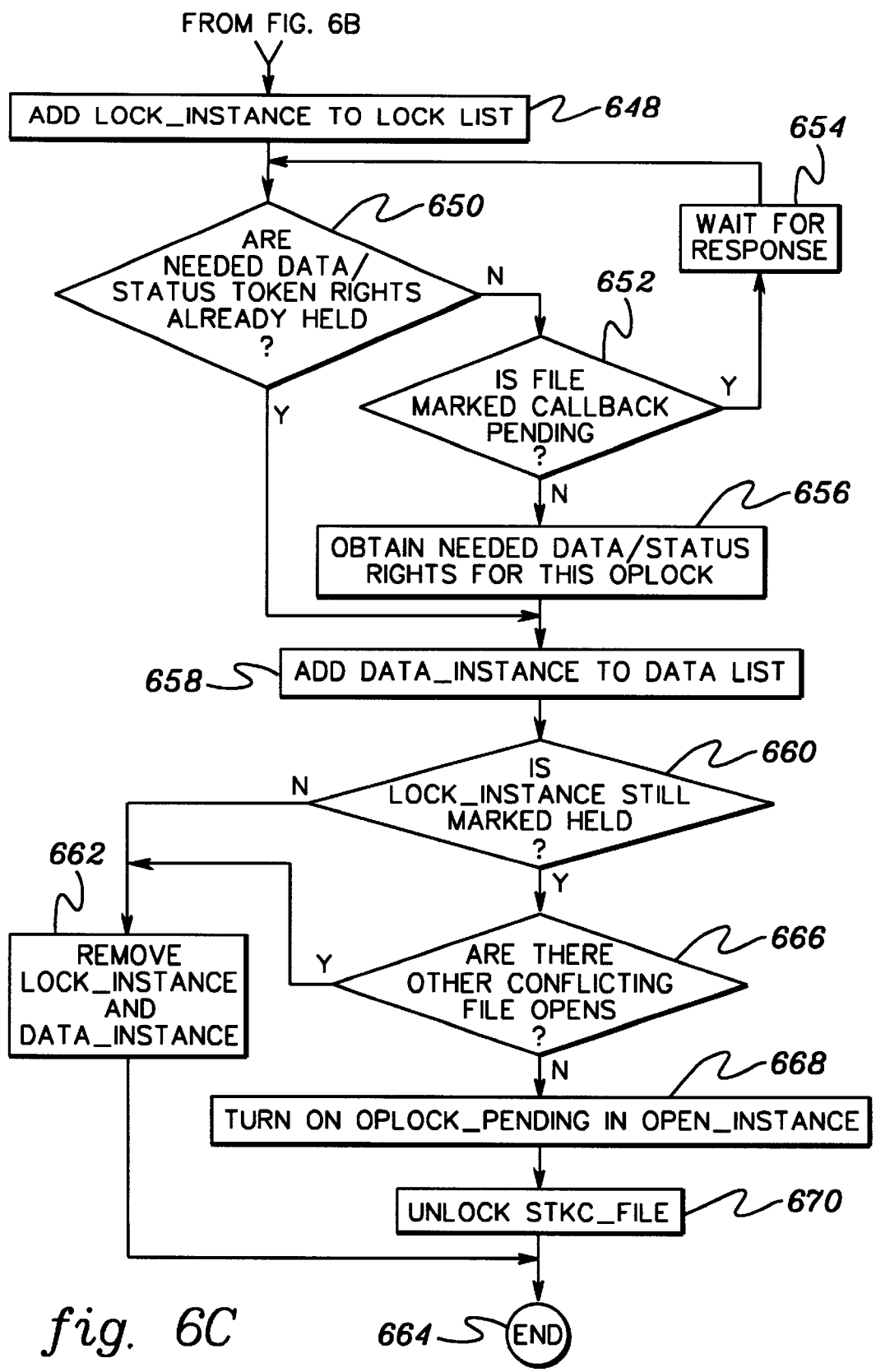

Returning to INQUIRY 616, if no files opened with oplock are found, then a determination is made as to whether any prior opens deny this open, INQUIRY 622. This is determined by checking the share modes of the various opened files. If this open is to be denied, then an error is returned, STEP 624. Otherwise, an open_instance is added to the list of file opens, STEP 626 (FIG. 6b).

Next, a determination is made as to whether an oplock is allowed, INQUIRY 628. That is, can an oplock even be attempted based on other file opens. For example, if the type of oplock is pre-CIFS, exclusive or batch, then an oplock is not allowed, if there is any other open_instance. As a further example, if the type is Level 2, then an oplock is allowed if all other opens are read-only.

If an oplock is not allowed, the open succeeds, but no oplock is granted, STEP 632. However, if an oplock is allowed, a check is made to see if needed lock rights are cached from the token manager. In particular, a check is made to see if a lock token is held that has rights needed by this type of oplock open, INQUIRY 634. If not, then a further determination is made as to whether the file is marked as callback pending, INQUIRY 636. If the file is marked as callback pending, then there is a wait for response, STEP 638, and processing continues with INQUIRY 634. However, if the file is not marked as callback pending, then a lock token is obtained from the token manager with the desired lock rights, STEP 640.

Subsequently, a determination is made as to whether a token was obtained, INQUIRY 642. If the token was not obtained, then processing of the open file routine is complete, STEP 644. However, if the token was obtained or if lock rights were already cached, then a further inquiry is made as to whether a whole range lock of the desired type (read or write depending on open type) can be granted, INQUIRY 646. If a whole range lock is not permitted, indicating that other processes from the same client could have the file locked, then processing of the open file routine is complete, STEP 644. However, if whole range lock is permitted, then a lock_instance is added to the lock list, STEP 648 (FIG. 6c), and steps are taken to obtain the data and status rights that will allow an oplock to be granted and the data to be cached by the client.

Thus, a further determination is made as to whether the desired data/status token rights are already held, INQUIRY 650. If the data/status token rights are not already held, then a further determination is made as to whether the file is marked as callback pending, INQUIRY 652. If the file is marked as callback pending, then there is a wait for the response, STEP 654, and processing then continues with INQUIRY 650. However, if the file is not marked as callback pending, then the data/status rights for this oplock is obtained from, for instance, the token manager, STEP 656. After obtaining the rights or if the rights were already held, then a data_instance is added to the data list, STEP 658.

Subsequently, a determination is made as to whether the lock_instance is still marked as held, INQUIRY 660. In particular, a check is made to see if the lock rights necessary for the whole file lock were revoked by the token manager while obtaining the needed data/status rights. This could happen if another client is byte range locking or accessing this file at the same time. An oplock is to be avoided in this case. Further, by allowing the revoke of the lock rights prevents deadlock, and avoiding a retry of the lock rights reduces thrashing in the token manager, if multiple clients are all hitting the same file at the same time.

If the lock_instance is not still marked as held, then the lock_instance and data_instance are removed from the lists and the oplock class, STEP 662, and processing of the open file routine is ended without granting the oplock, STEP 664.

However, if the lock_instance is still marked as held, then a further check is made to see if there are any other conflicting file opens that would prevent this oplock, INQUIRY 666. This check is made to ensure that no other process of the client has opened the file, while performing the multistage obtaining of the oplock. If so, then the lock_instance and data_instance are removed, STEP 662, and processing of the open file routine is complete, STEP 664. However, if there are no other conflicting file opens, then oplock pending is turned on in the open_instance, STEP 668. The oplock cannot be fully granted at this time, however, since it is not known if physical file system processing or the reply to the client will be successful.

Subsequent to setting the oplock_pend field in the open_instance, the STKC_file is unlocked, STEP 670, completing the processing of the open file routine.

Returning to FIG. 5, after performing the open file processing, a determination is made as to whether data/lock instances exist and are a part of the oplock class and whether the open was successful, INQUIRY 510. If the data/lock instances do not exist as part of the oplock class or the open was unsuccessful, then an indication is made to the caller that the oplock failed, STEP 512. However, if the data/lock instances exist and are part of the oplock class and the open succeeded, then an indication that the oplock was granted is returned to the caller, STEP 514. This completes the HandleOpen processing.

After forwarding the reply to the client or otherwise completing the open processing, a routine referred to as Done Open is called. This routine receives as input the result of the physical file system open. One embodiment of the logic associated with this routine is described with reference to FIG. 7.

Initially, the STKC_file is locked, STEP 700, and the oplock_pending bit in the open_instance is turned off, STEP 701. Thereafter, a determination is made as to whether the open was successful, INQUIRY 702. If it was successful, then if an oplock was marked pending by open file, then the oplock is now considered granted. Further, the oplock_type is set to indicate the type of oplock held, STEP 704, and the oplock_held bit in the open_instance is turned on, STEP 705.

Returning to INQUIRY 702, if the open was not successful, then the lock_instance, open_instance and data_instance for this file open are removed, STEP 706.

Thereafter, or after turning on the oplock_held bit, the STKC_file is unlocked, STEP 710, concluding the open processing.

Figure 8:
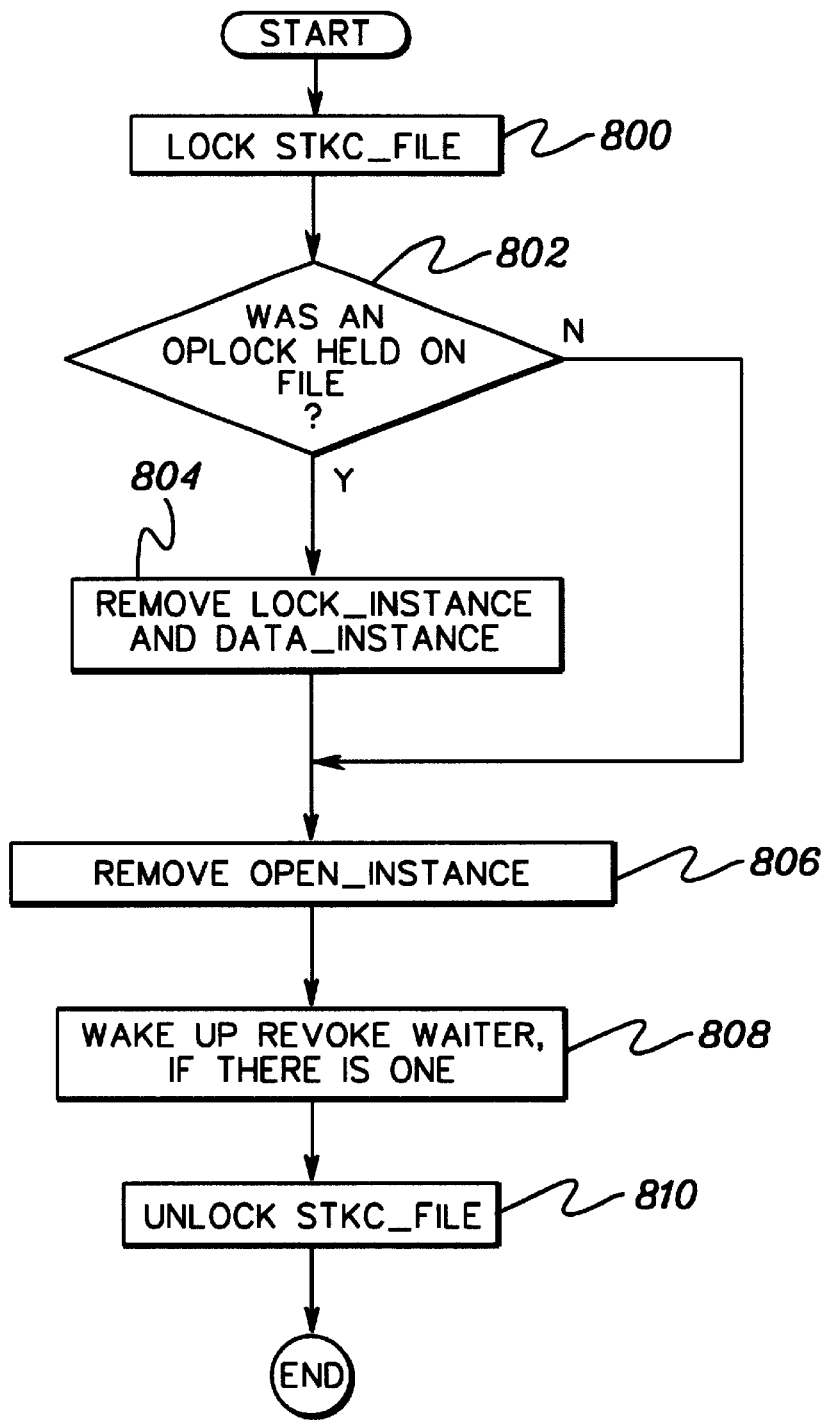
FIG. 8 depicts one embodiment of the logic associated with close processing, in accordance with the principles of the present invention.

When a file is no longer needed, it is closed. The file close processing includes removing the open_instance, and if an oplock was held, then the associated lock_instance and data_instance. If a revoke is pending (waiting for a callback response), then the revoking thread is awoken. One embodiment of the logic associated with a close operation is described with reference to FIG. 8. Input to the close operation is an open_instance address.

Initially, the appropriate STKC_file is locked, STEP 800. Thereafter, a determination is made as to whether an oplock was held on the file, INQUIRY 802. This is determined by checking whether a data_instance and lock_instance exists. If so, then an oplock was held. If an oplock was held, then the lock_instance and data_instance are removed, STEP 804. Thereafter, or if an oplock was not held on the file, then the open_instance is removed, STEP 806.

In addition to the above, the revoke waiter is awoken, if there is one, STEP 808. In one example, it is the callback-wait field of the STKC_file that indicates whether there is a revoke waiter. Thereafter, the STKC_file is unlocked, STEP 810, and close processing is complete.

In addition to the above processing, processing is also provided to handle an oplock, after a callback response is received by the server. In particular, processing is performed to indicate that the oplock is not held anymore. In one example, a callback response routine is used to perform this processing. One embodiment of a callback response routine is described with reference to FIG. 9. Input to this routine is an open_instance address.

Figure 9:
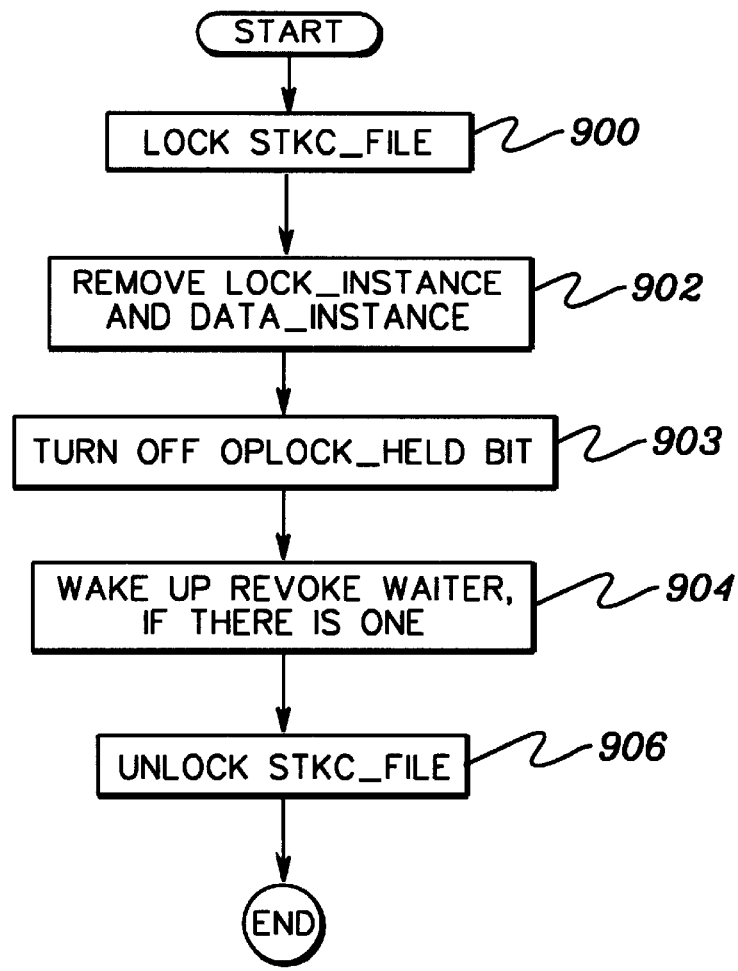
FIG. 9 depicts one embodiment of the logic associated with a callback response, in accordance with the principles of the present invention.

Referring to FIG. 9, initially, the STKC_file is locked, STEP 900. Thereafter, the lock_instance and data_instance are removed indicating that the oplock is not held anymore, STEP 902, and the oplock_held bit is turned off, STEP 903. Subsequently, the revoke waiter is awoken, if one exists, STEP 904. Further, the STKC_file is unlocked, STEP 906. This completes the processing of the callback response.

In the logic described above, tokens were obtained to provide certain rights to the client. In one embodiment, token processing is performed on each operation to ensure, for instance, that remote client caches are not corrupted. As one example, the tokens needed for a particular operation are obtained using token set (tkset) processing. For example, DFS file servers use a token set or tkset component to obtain data and status tokens for client operations (i.e., for each remote procedure call (RPC)) to ensure the needed tokens are held for each operation. Some operations, such as rename, involve multiple files and hence, there would be multiple files to get tokens for, hence a set. The SMB/CIFS token management of the present invention also includes a tkset function, which is described in detail herein.

The tkset function for SMB token management uses a generic host to reduce token conflicts. For example, when the server obtains tokens on behalf of a client operation, it checks to see if the tokens reside on a specific host, or if any file opens are present on the specific host (e.g., open list not null). If so, then the tokens are obtained for the specific host. However, if neither are true, the tokens are obtained on behalf of the generic host. For example, tokens for directories are usually obtained on the generic host, since they are usually not opened. Tokens for files are usually obtained on the specific host, since they are usually opened and usually oplocked, but they are not required to be. For example, an SMB_getattr operation simply asks for file status of a non-open file, which means the tokens could be obtained on the generic host. Token rights are considered not to conflict with tokens held by the same host. Thus, the more tokens that are obtained on the generic host, the less conflicts and hence, the less token revocation processing by the token manager.

In one example, tokens for byte range locks and for operations on open or oplocked files use the specific host and not the generic host to avoid unnecessary revokes or deadlock during callback processing.

Figure 10:
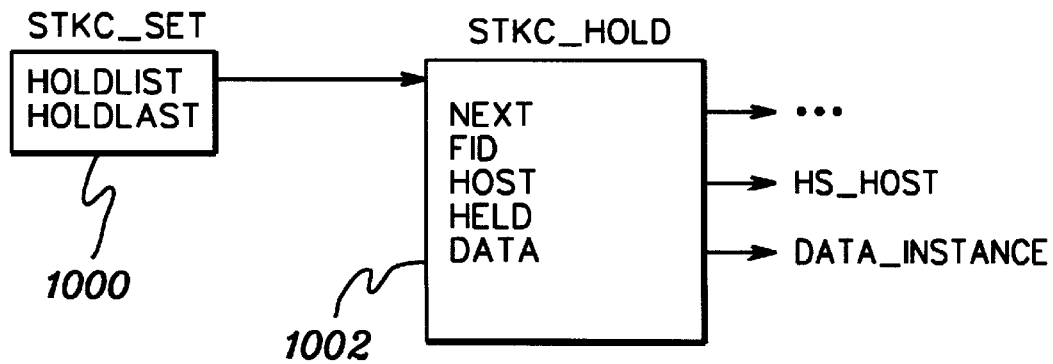
FIG. 10 depicts one embodiment of data structures used for token processing, in accordance with the principles of the present invention.

A token set is a set of files for which token rights are obtained before a particular operation is performed at the server. For example, a remove file operation requires tokens from the directory where the file is to be removed from and the file itself. Thus, a remove file operation creates a token set and adds token rights for the directory and the file itself. A token set is represented by a data structure and each file that is a part of the token set is represented by another data structure. One example of these data structures is described with reference to FIG. 10.

An STKC_Set data structure 1000 includes a hold list that is a pointer to one or more STKC_hold data structure 1002. Each STKC_hold data structure represents the tokens held for a particular hs_host. An STKC_hold data structure has a plurality of fields including, for instance, a next field indicating the next STKC_hold in the list; a file identifier; a host field indicating the hs_host associated with the file; a held field indicating whether tokens are held for the file; and a data field pointing to a data_instance having the rights held for that file.

STKC_Set also includes a hold last variable that indicates the last STKC_hold structure in the list.

In one example, in order to obtain data/status token rights for a particular file, an add token set routine is used. One embodiment of such a routine is described with reference to FIG. 11. Input to the routine is a file id, the address of the specific host (hs_host) of the desired file and the rights desired for the file. To avoid deadlock, tkset processing releases any token holds (internally) for all files in a set other than the file currently being added to the set. If a revoke was received on a different file in the set, the caller to AddTokenSet is notified in case they need to take special action. Thus, AddTokenSet checks to see if the token rights are held and if not, it obtains them from the token manager after first releasing any internal holds on other files in the set (which makes the tokens held for those files revokable). Since holds on files in a token set are released, it may be that after the token for the new file is obtained, a token on a prior file in the set needs to be re-obtained, which is why the AddTokenSet processing loops when obtaining tokens for new files in a set.

Figure 11:
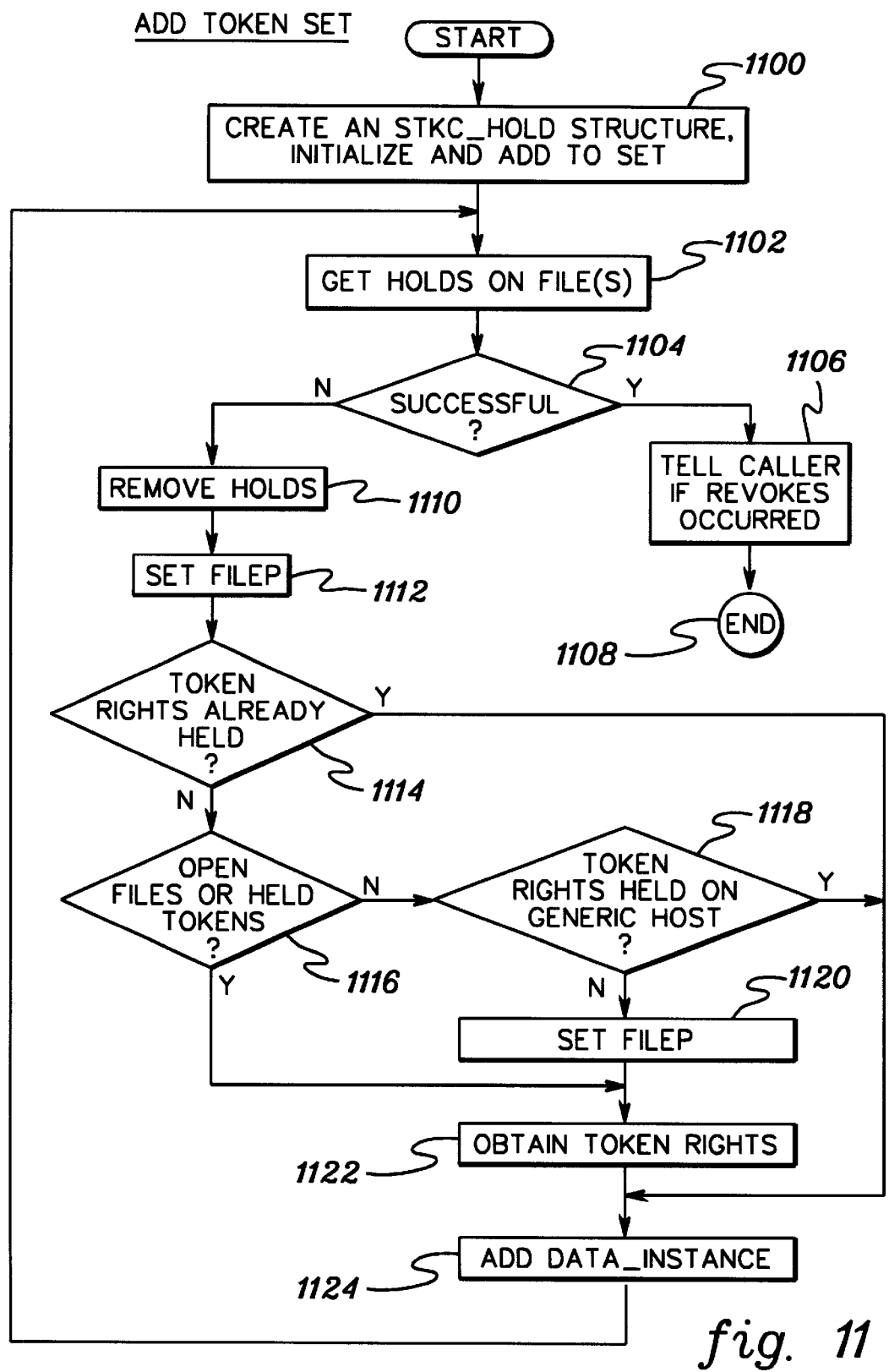
FIG. 11 depicts one embodiment of the logic associated with adding a token to a token set, in accordance with the principles of the present invention.

Referring to FIG. 11, initially, an STKC_hold structure is created and initialized, STEP 1100. For example, the fid field is set equal to the file identifier, the host field is set equal to the hs_host corresponding to the file, and the held field is set equal to 0. Additionally, the STKC_hold structure is added to the token set.

Figure 12:
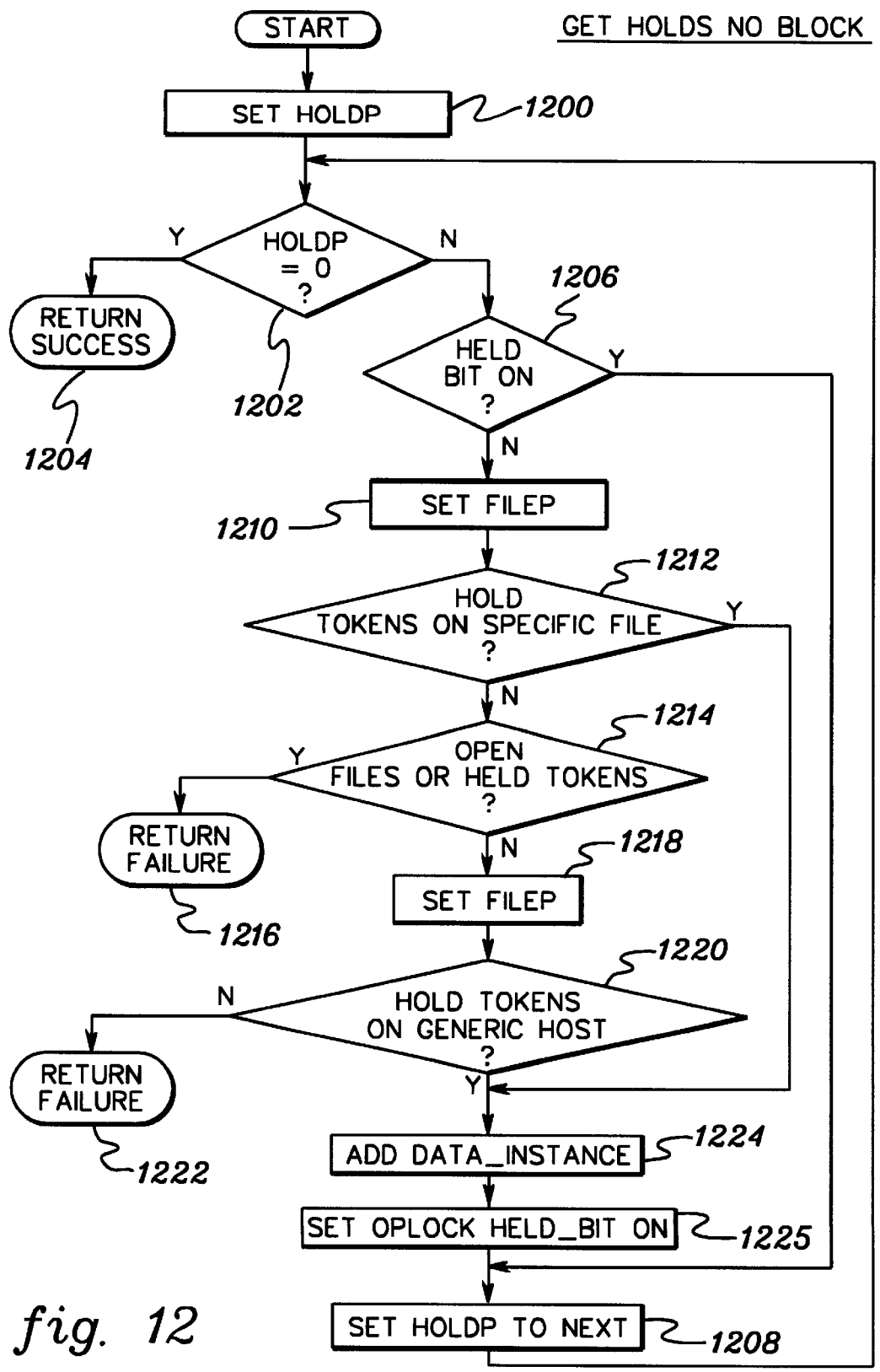
FIG. 12 depicts one embodiment of the logic associated with obtaining holds on files, in accordance with the principles of the present invention.

Subsequently, holds are obtained on each file not marked as held, STEP 1102. One embodiment of the logic associated with obtaining the holds is described with reference to FIG. 12.

Initially, a variable referred to as holdp is set equal to the first hold structure in the list for the token set, STEP 1200. Thereafter, a determination is made as to whether the variable holdp is equal to 0, INQUIRY 1202. If it is equal to 0, then there are no more files to be marked as held, so a success condition code is returned, STEP 1204.

However, if holdp is not equal to 0, then a further determination is made as to whether the held bit in STKC_hold addressed by holdp is on, INQUIRY 1206. If it is on, then holdp is set equal to the next STKC_hold in the list, STEP 1208, and processing continues with INQUIRY 1202. However, if the held bit is not on, then a variable referred to as filep is set equal to the address of the STKC_file for the specific host, if it exists, STEP 1210.

Subsequently, a determination is made as to whether tokens are allowed to be held on a specific file, INQUIRY 1212. If they are not allowed, then a further determination is made as to whether there are open files or held tokens on the specific file, INQUIRY 1214. This is determined by, for instance, checking the TokenRights field of the designated STKC_file. If there are open files or held tokens on the specific file, then a failure status code is returned to the caller, STEP 1216.

However, if there are no open files or held tokens, then filep is set equal to the STKC_file for the generic host, STEP 1218. Thereafter, a determination is made as to whether tokens are allowed to be held on the generic host, INQUIRY 1220. If tokens are not allowed to be held on the generic host, then a failure status code is returned to the caller, STEP 1222. On the other hand, if held tokens are allowed on the generic host or are allowed for a specific file, INQUIRY 1212, then a data_instance for the file is added to the STKC_file addressed by filep to indicate a hold on the file, STEP 1224, and the oplock_held bit is set on, STEP 1225. Thereafter, holdp is set equal to the next STKC_hold in the list, STEP 1208, and processing continues with INQUIRY 1202.

Returning to FIG. 11, and in particular to STEP 1102, after calling the get holds no block routine (described with reference to FIG. 12), a determination is made as to whether a successful status code was returned from the routine, INQUIRY 1104. If it was successful, then the caller is told whether there are any revokes that occurred as specified by the output of the routine returned by AddtokenSet, STEP 1106, and the processing for adding the token to the token set is complete, STEP 1108.

Figure 13:
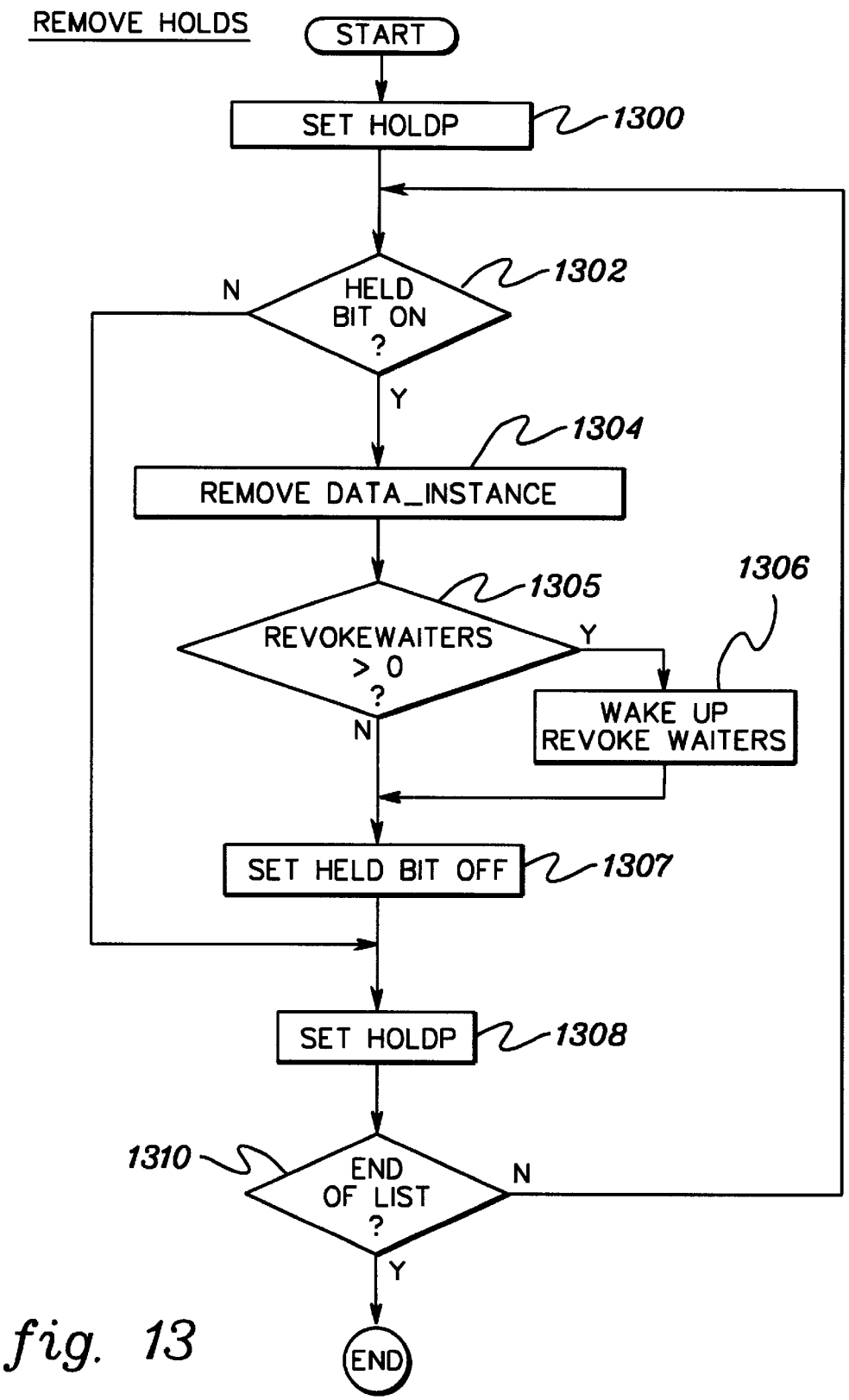
FIG. 13 depicts one embodiment of the logic associated with removing holds on files, in accordance with the principles of the present invention.

However, if an unsuccessful status code was returned, then holds on files marked held in the set are removed, STEP 1110. One embodiment of the logic associated with removing holds from files marked held is described with reference to FIG. 13.

Initially, holdp is set equal to the first STKC_hold in the list, STEP 1300. Thereafter, a determination is made as to whether the held bit is on, INQUIRY 1302. If the held bit is on, then the data_instance is removed from the associated file, STEP 1304, and a determination is made as to whether revokewaiters is greater than zero, INQUIRY 1305. If revokewaiters is greater than zero, than the revoke waiters are awoken, STEP 1306. Further, or if the revokewaiters is not greater than zero, then the held bit is set equal to off, STEP 1307.

Subsequently, or if the hold bit is not on, holdp is set equal to the next STKC_hold in the list, STEP 1308. A determination is then made as to whether the end of the list has been reached, INQUIRY 1310. If the end of the list has not been reached, then processing continues with INQUIRY 1302. However, if the end of the list has been reached, then the remove holds routine is complete.

Returning to FIG. 11, and in particular, to STEP 1110, subsequent to removing the holds, filep is set equal to the address of the STKC_file of the specific host, if it exists, STEP 1112. Thereafter, a determination is made as to whether token rights are already held on the specific host, INQUIRY 1114. If there are no token rights already held, then a further determination is made as to whether there are open files or held tokens already on the specific host, INQUIRY 1116.

Should there be no open files or held tokens on the specific host, then another check is made to determine if there are token rights held on the generic host, INQUIRY 1118. This determination is made, for instance, by checking the particular STKC_file associated with the generic host. If there are no tokens rights held on the generic host, then filep is set to point to the STKC_file on the generic host, STEP 1120.

Thereafter, or if there are open files or held tokens, the token manager is called to obtain token rights for the file, STEP 1122. Additionally, a data_instance for the file is added to the STKC_file list to indicate a hold on the token rights, STEP 1124, and processing continues with STEP 1102.

Returning to INQUIRY 1114, if token rights are already held on the specific host, or if token rights are already held on the generic host, INQUIRY 1118, then processing continues with adding the data_instance for the file to the STKC_file list to indicate a hold of the token rights, STEP 1124. This completes the add token set processing.

In addition to the above, a token set hold can be removed by invoking the remove holds logic, which removes the data instances, as described above.

When another client needs a token, token revocation is performed. In particular, the token manager calls back to the host code to return to the token manager tokens or rights to a token. The token manager uses a fast revoke capability, in accordance with the principles of the present inventions when the client's token cache is at the server and when various conditions are met. For example, fast revoke is used if there are no oplocks held, there are no pending oplock breaks, and if there are no threads that have holds on the file via tkset. However, if the fast revoke fails, then the token manager calls a slow revoke capability or dispatches onto one of the worker threads. The use of fast revoke greatly reduces thread switching and dispatch when revoking SMB client tokens from more than one host (client), as one example, since dispatching is only needed in certain circumstances.

Figure 14A:
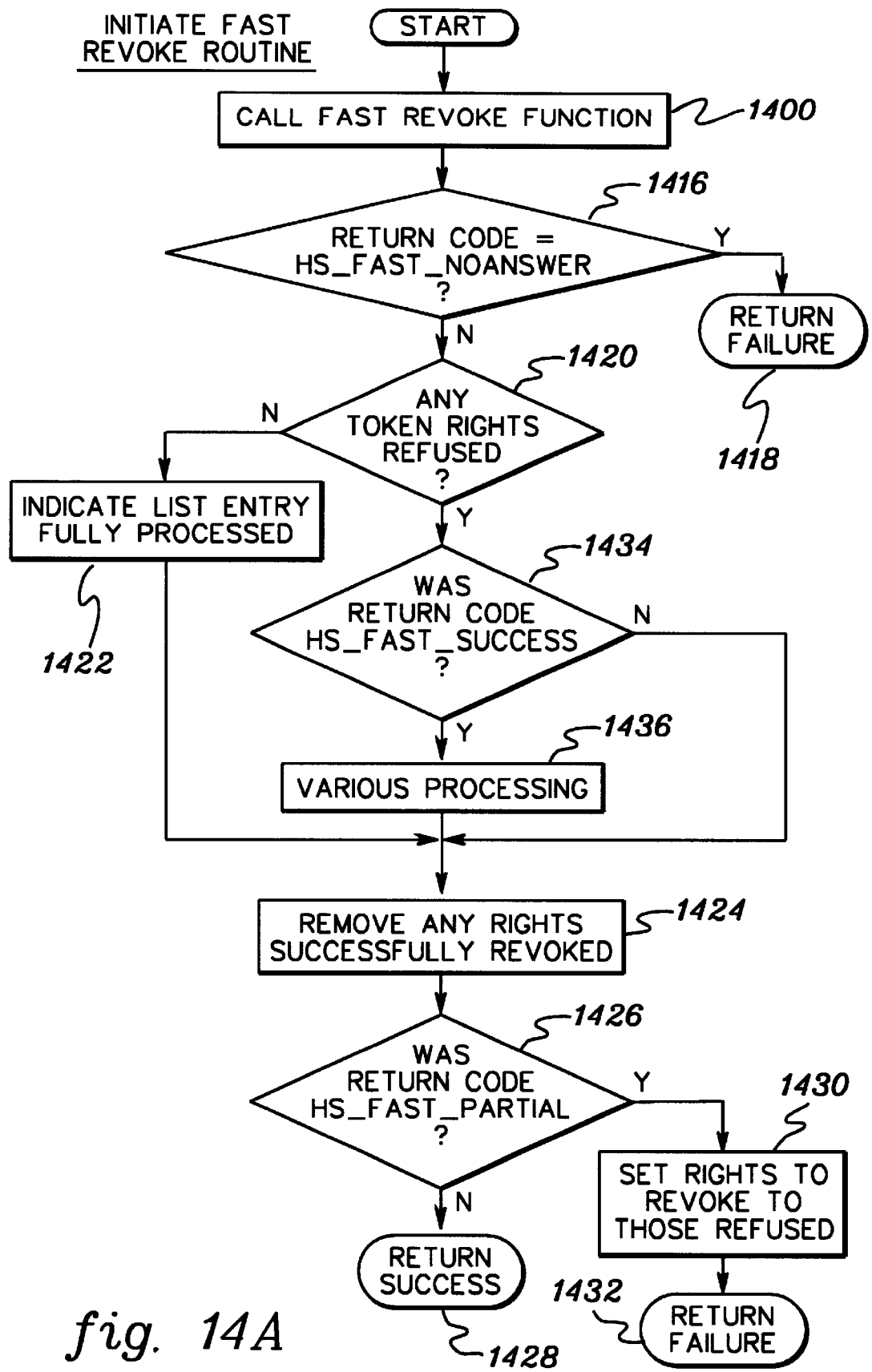
FIGS. 14a–14b, depict one embodiment of the logic associated with fast revoke processing, in accordance with the principles of the present invention.
Figure 14B:
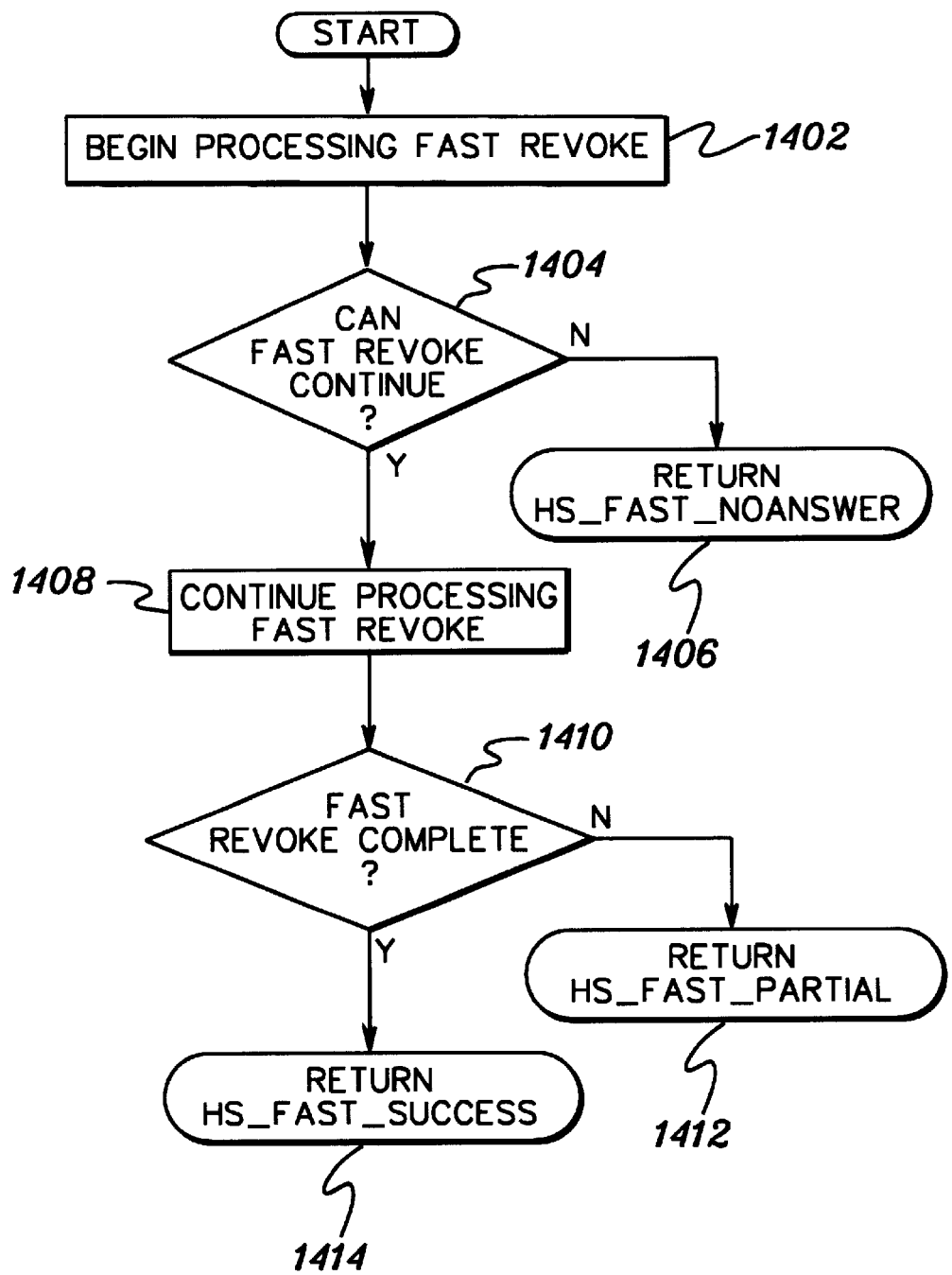

One embodiment of the logic associated with initiating a fast revoke routine is described with reference to FIGS. 14*a*–14*b*. Referring to FIG. 14*a*, initially, the server calls a fast revoke function passing to the function a specific host (e.g., hs_host structure) that includes the token information addressed by the conflict, STEP 1400. The fast revoke function then attempts to perform the revoke processing.

One embodiment of the logic associated with the fast revoke function is described with reference to FIG. 14*b*. Initially, processing of the fast revoke function begins, STEP 1402. In one example, this processing includes determining whether the fast revoke function can be used or whether a slow revoke function is needed. A fast revoke function is used when tokens can be quickly reclaimed from the token cache, when the token cache is on the same machine as the file server and certain conditions are met. With a fast revoke, the server uses the same thread that is processing the request for the one or more tokens to call the fast revoke processing. For instance, if a client (e.g., Client 2) requests a token from the token manager and the token manager determines that it needs to revoke tokens from one or more clients (e.g., Clients 4, 5 and 6), then the server uses the same thread that the request came on to initiate the revoking of the tokens from Clients 4, 5 and 6. In contrast, with a slow revoke routine, the work would be spawned into three pieces and dispatched onto three separate threads, one for each of Clients 4, 5 and 6.

In one example, the fast revoke processing is not used if the token cache resides at the client (rather than the server) or one of the following three conditions (as examples) is met: There is an oplock break pending, an oplock is currently being held or there are threads that have holds on files via the tkset processing. Thus, if any one of those three conditions is met or if the token cache does not reside at the server, then fast revoke processing is not used. Thus, during the beginning processing of the fast revoke function, the server determines whether the fast revoke routine should continue. If fast revoke processing is not to be used, INQUIRY 1404, then a status code of HS__Fast__Noanswer is returned to the caller, STEP 1406. HS__Fast__Noanswer indicates that token rights cannot be revoked via the fast path, and instead a long path (or slow revoke) is to be used.

Returning to INQUIRY 1404, if the fast revoke function can be performed, then fast revoke processing is continued, STEP 1408. In particular, the fast revoke processing proceeds to attempt to revoke the requested token rights. This revoke processing is similar to the slow revoke processing provided by Open Software Foundation (OSF) and used for DFS clients, as one example. Since revoke processing is known in the art, it is not described in detail herein. However, the following notes are provided that are specific to oplocks.

As one example, if an oplock is in-progress, then a callback is to be received before performing the revoke. In particular, there is a wait for the callback, so that the oplock can be broken immediately after it is granted. As a is further example, if an oplock is not pending, but the lock__instance is attached to the open__instance (oplock has obtained open and lock hold, but not data/status yet), the lock__instance is detached from the open__instance and removed from the lock__instance list to ensure a byte range lock request from another client properly breaks the oplock and to ensure the byte range look of the another client is not improperly prevented.

Processing of the fast revoke continues until it is complete or an error is encountered. Thereafter, a determination is made as to whether the fast revoke is complete, INQUIRY 1410. As one example, a determination is made as to whether a condition was encountered that caused the fast revoke processing to end prematurely. For instance, assume the fast revoke processing was to revoke ten token rights; however, after processing only five of those rights, it was determined that fast revoke processing could not continue. Thus, fast revoke processing ended prematurely.

If the fast revoke function did not complete processing of all the token rights requested, then an HS__Fast__Partial status code is returned to the caller, STEP 1412. HS__Fast__Partial indicates that some token rights were handled via the fast path and some were not. Thus, a call to the slow revoke routine is still needed, for those rights that were not processed.

Returning to INQUIRY 1410, if the fast revoke function did process to completion, then an HS__Fast__Success status code is returned to the caller, STEP 1414. HS__Fast__Success indicates that the fast path succeeded; however, it is not an indication that all token rights were returned. It may be that some rights (e.g., a lock right) could not be returned, at that time (hence, refused).

Returning to FIG. 14a, after processing the fast revoke function, a determination is made as to whether the return code is equal to HS__Fast__Noanswer, INQUIRY 1416. If the return code is HS__Fast__Noanswer, then a failure status code is returned, STEP 1418, and the long path or slow revoke routine is to be called. However, if the return code is not equal to HS__Fast__Noanswer, then a further determination is made as to whether any token rights were refused, INQUIRY 1420.

If no token rights were refused, then an indication is made that the list entry is fully processed, STEP 1422, and any rights successfully revoked are removed, STEP 1424. Further, a determination is made as to whether the return code is HS__Fast__Partial, INQUIRY 1426. If the return code does not indicate a partial processing of the fast revoke function, then a successful status code is returned, STEP 1428. However, if the return code indicates that only some of the token rights were processed, then a variable referred to as rights-to-revoke is set to those rights that were refused, STEP 1430, and a failure is returned to the caller, STEP 1432 (which will force a slow revoke path for the unprocessed rights).

Returning to INQUIRY 1420, if any token rights were refused, then a determination is made as to whether the return code is equal to HS__Fast__Success, INQUIRY 1434. If the return code indicates a success, but that token rights were refused, then certain processing is performed, depending on the situation. For example, if a lock right was refused, then an indication is made as to which process is holding the lock, and an error code is set. Thereafter, or if the return code is not equal to HS__Fast__Success, processing continues with STEP 1424, as described above. This completes the description of fast revoke processing.

Described in detail above is a token management capability that allows different types of clients (e.g., clients with different semantics) to access the same data or files. For example, DFS token management supports SMB/CIFS semantics, allowing for proper file sharing between SMB/CIFS clients, local users and remote DFS/DCE clients. However, DCE is not required to be running, if only SMB clients are present. The various aspects of the present invention provide a number of advantages, including, for instance, the following:

By integrating SMB/CIFS semantics with DFS token management, no client or server kernel software changes are required to support SMB/CIFS client access to Unix File Systems. It is desirable to avoid client software changes, since there are many clients relative to the number of servers. Avoiding changes to the base server Unix operating system is also desirable to allow the DFS/DCE product to be applied to older releases of the server operating system software (i.e., any server Unix operating system that supports DFS/DCE can use the support).

By integrating SMB/CIFS support with DFS token management, local user access is detected by the current DFS glue. This allows for proper cache invalidation (oplock break in SMB terms), when local users update, rename, etc. files oplocked by SMB users.

Since local access goes through the DFS glue code, and since other remote file protocols such as NFS also run the DFS glue code, NFS file access will also properly invalidate remote SMB client caches for free, since its accesses will cause token revocation and hence oplock breaks.

By providing the OPEN__DENY mode tokens, SMB open semantics are fully supported. Rather than simply ignoring file sharing between SMB or DFS/DCE users as would be the case if SMB file sharing support were a separate piece of software or product running on the server, an SMB/CIFS file open can guarantee that the sharing modes are honored, not only with respect to SMB clients, but also factoring in local users and remote DFS/DCE clients too.

By providing the opportunistic lock classes and technique to obtain an oplock via DFS token management, opportunistic locking is supported and the remote SMB/CIFS clients caches are maintained with integrity with respect to each other, local users and remote DFS/DCE clients.

By providing a fast polling mechanism on the server for DFS token management, revoke processing task switches to handle revokes are minimized, which significantly reduces CPU time if a token held for an SMB client can be revoked immediately without need for a callback (oplock break) to the client.

By providing a generic host, tokens for non-oplocked files (usually directories) can be obtained on behalf of a generic host that represents all (or some subset of) SMB clients. Since tokens do not conflict when held by the same host, this reduces the number of token conflicts generated by SMB clients, and hence the amount of revoke processing, which can be expensive. It also reduces storage, since tokens for non-oplocked files are kept on a single generic host rather than on each specific host.

Although the examples are described with reference to SMB and DFS/DCE, these are only examples. The invention is also applicable to other protocols that wish to share files, but may have differing semantics. For example, the use of a server token cache, a mask in the host structure representing the client, a generic host and/or fast revoke may be used with any number of various differing protocols.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of sharing data within a computing environment, said method comprising:
    caching data in a first cache of said computing environment using a first protocol;
    caching at least a portion of said data in a second cache of said computing environment using a second protocol, said second protocol being different from said first protocol; and
    providing cache consistency between said first cache and said second cache without modifying one or more clients, using at least one of said first protocol and said second protocol, to accommodate the protocol of the other of said first protocol and said second protocol, wherein a change to data common to said first cache and said second cache is reflected in said first cache and said second cache.

2. The method of claim 1, wherein said first protocol comprises using at least one opportunistic lock to cache data in said first cache.

3. The method of claim 2, wherein said caching data in said first cache comprises obtaining at least one token to represent said at least one opportunistic lock.

4. The method of claim 1, further comprising opening a file associated with said data, wherein said opening allows said file to be opened in one or more share modes.

5. The method of claim 4, wherein said one or more share modes are represented by one or more tokens used to manage said file.

6. The method of claim 1, wherein said caching data in said second cache comprises caching said data by a Unix-compliant client.

7. The method of claim 6, wherein said Unix-compliant client comprises a Distributed File Services (DFS) for Distributed Computing Environment (DCE) client.

8. The method of claim 1, wherein said caching data in said first cache comprises caching said data by a non-Unix compliant client.

9. The method of claim 8, wherein said non-Unix-compliant client comprises a Windows client.

10. The method of claim 8, wherein said non-Unix-compliant client comprises a Server Message Block (SMB) client.

11. The method of claim 1, wherein said caching data in said first cache and said caching data in said second cache is managed by a single server.

12. The method of claim 11, wherein said single server comprises a server token cache used when caching data in at least one of said first cache and said second cache.

13. A method of sharing data within a computing environment, said method comprising:
    determining whether an open of a file associated with data to be cached has occurred that conflicts with granting of at least one opportunistic lock, said at least one opportunistic lock being represented by at least one token;
    deleting a hold on one or more tokens of said at least one token when the conflicting open has occurred, wherein said at least one opportunistic lock is not granted;
    caching data in a first cache of said computing environment using a first protocol, said first protocol comprising using at least one granted opportunistic lock to cache data in said first cache, and wherein said caching data in said first cache comprises obtaining at least one token to represent said at least one granted opportunistic lock;
    caching at least a portion of said data in a second cache of said computing environment using a second protocol, said second protocol being different from sand first protocol; and
    providing cache consistency between said first cache and said second cache, wherein a change to data common to said first cache and said second cache in reflected in said first cache and said second cache.

14. A method of sharing data within a computing environment, said method comprising:

caching data in a first cache of said computing environment using a first protocol, said first protocol comprising using at least one opportunistic lock to cache data in said first cache, and wherein said caching data in said first cache comprises obtaining at least one token to represent said at least one opportunistic lock, wherein said obtaining comprises obtaining one or more lock token rights and one or more data/status token rights, which represent the at least one token of said at least one opportunistic lock;

caching at least a portion of said data in a second cache of said computing environment using a second protocol, said second protocol being different from said first protocol; and providing cache consistency between said first cache and said second cache, wherein a change to data common to said first cache and said second cache is reflected in said first cache and said second cache.

15. The method of claim 14, further comprising obtaining one or more open token rights associated with said data, said one or more open token rights providing information used for obtaining at least one of said one or more lock token rights and said one or more data/status token rights.

16. The method of claim 15, wherein said one or more open token right, said one or more lock token rights and said one or more data/status token rights are obtained in a predefined order.

17. The method of claim 7, wherein said predefined order comprises obtaining said one or more open token rights, then said one or more lock token rights and then said one or more data/status token rights.

18. The method of claim 16, wherein said predefined order is selected to avoid deadlock when obtaining the at least one token of said at least one opportunistic lock.

19. The method of claim 14, further comprising:
determining whether said one or more lock token rights are still hold; and
deleting a hold on said one or more data/status token rights, when said one or more lock token rights are not still held.

20. A method of sharing data within a computing environment, said method comprising:
caching, by a first client, data in a first cache of said computing environment using a first protocol;
caching, by second client, at least a portion of said data in a second cache of said computing environment using a second protocol, said second protocol being different from said first protocol;
providing cache consistency between said first cache and said second cache, wherein a change to data common to said first cache and said second cache is reflected in said first cache and said second cache; and
wherein opening a file associated with said data allows said file to be opened in one or more share modes, even though one of said first client and said second client does not support said one or more share modes.

21. The method of claim 20, further comprising masking said one or more share modes from said one of said first client and second client that does not support said one or more share modes.

22. A method of sharing data between clients of a computing environment, said method comprising:
accessing a file by a first client of said computing environment, said first client having a first protocol; and
accessing said file by a second client of said computing environment, said second client having a second protocol, said second protocol being different from said first protocol, and wherein a change to said file by one of said first client and said second client is reflected to the other of said first client and said second client without modifying at least one of the first client and the second client to accommodate the protocol of the other of the first client and the second client, thereby providing cache consistency.

23. The method of claim 22, further comprising accessing said file by a local user of said computing environment.

24. The method of claim 22, wherein the accessing of said file by said first client and said second client does not require software changes to said first client or said second client.

25. The method of claim 22, wherein the accessing of said file by said first client and said second client does not require changes to an operating system of a server managing said first client and said second client.

26. The method of claim 22, further comprising opening said file, wherein said opening comprises performing a first phase to indicate that one or more rights associated with said open are pending grant and performing a second phase to indicate whether said opening is successful.

27. The method of claim 22, wherein said first protocol comprises a token management protocol.

28. The method of claim 22, wherein said second protocol comprises an opportunistic locking protocol.

29. The method of claim 22, wherein one or more token rights are associated with said file, and said method further comprises initiating revocation of at least one token right of said one or more token rights.

30. The method of claim 22, further comprising masking one or more rights associated with one of said first client and said second client from the other of said first client and said second client.

31. The method of claim 22, wherein at least one client of said first client and said second client is remote from a server of the computing environment, and wherein said method further comprises obtaining at least one token right from a server token cache for one or more of said at least one client to be used in accessing said file.

32. The method of claim 26, wherein at least one of said one or more rights includes an opportunistic lock.

33. The method of claim 22, further comprising representing said first client using at least one specific data structure for said first client.

34. The method of claim 22, further comprising representing said second client using at least one specific data structure for said second client.

35. The method of claim 34, further comprising representing said second client using at least one generic data structure, said at least one generic data structure being capable of representing a plurality of clients.

36. The method of claim 22, wherein said file is represented by a first data structure, said first data structure including information relating to said file.

37. A method of sharing data between clients of a computing environment, said method comprising:
opening a file, wherein said opening comprises performing a first phase to indicate that one or more rights associated with said open are pending grant and performing a second phase to indicate whether said opening is successful, and wherein said opening further comprises granting said one or more rights when said opening is successful;
accessing said file by a first client of said computing environment, said first client having a first protocol;
accessing said file by a second client of said computing environment, said second client having a second protocol, said second protocol being different from said first protocol, and wherein a change to said file by one of said first client and said second client is reflected to the other of said first client and said second client, thereby providing cache consistency.

38. The method of claim 37, wherein at least one of said one or more rights includes an opportunistic lock.

39. The method of claim 37, wherein said file is represented by a first data structure said first data structure including information relating to said file.

40. The method of claim 37, further comprising representing said first client using at least one specific data structure for said first client.

41. The method of claim 37, further comprising representing said second client using at least one specific data structure for said second client.

42. The method of claim 41, further comprising representing said second client using at least one generic data structure, said at least one generic data structure being capable of representing a plurality of clients.

43. A method of sharing data between clients of a computing environment, said method comprising:

accessing a file by a first client of said computing environment, said first client having a first protocol;

accessing said file by a second client of said computing environment, said second client being represented using at least one specific data structure for said second client and at least one generic data structure, said at least one generic data structure being capable of representing a plurality of clients;

obtaining one or more token rights of said file on behalf of the clients represented by said at least one generic data structure, said one or more token rights being usable in managing access to said file by said second client; and wherein said second client has a second protocol said second protocol being different from said first protocol, and wherein a change to said file by one of said first client and said second client is reflected to the other of said first client and said second client, thereby providing cache consistency.

44. The method of claim 43, wherein said obtaining comprises:

determining whether at least one token right is already being held for said second client as represented by said specific data structure;

determining whether at least one token right is already being held for said second client as represented by said generic data structure; and obtaining said one or more token rights when token rights are not already being held for said second client represented by said specific data structure and said generic data structure.

45. A method of sharing data between clients of a computing environment, said method comprising:

accessing a file by a first client of said computing environment, said first client having a first protocol;

accessing said file by a second client of said computing environment, said second client being represented using at least one specific data structure for said second client and at least one generic data structure, said at least one generic data structure being capable of representing a plurality of clients;

obtaining one or more token rights of said file on behalf of said second client represented by said specific data structure, rather than on behalf of said second client represented by said generic data structure; and wherein said second client has a second protocol, said second protocol being different from said first protocol, and wherein a change to said file by one of said first client and said second client is reflected to the other of said first client and said second client, thereby providing cache consistency.

46. The method of claim 45, wherein said one or more token rights are obtained on behalf of said second client represented by said specific data structure, when said file is open.

47. A method of sharing data between clients of a computing environment, said method comprising:

accessing a file by a first client of said computing environment, said first client having a first protocol, and said file having one or more token rights associated therewith;

accessing said file by a second client of said computing environment, said second client having a second protocol, said second protocol being different from said first protocol, wherein a change to said file by one of said first client and said second client is reflected to the other of said first client and said second client, thereby providing cache consistency; and initiating revocation of at least one token right of said one or more token rights, wherein said initiating revocation comprises:

determining whether one or more predefined conditions are met; and invoking a fast revoke routine to attempt to revoke said at least one token right, when the one or more predefined conditions are not met.

48. The method of claim 47, wherein said one or more predefined conditions comprises at least one of a pending oplock break, a currently held oplock, and one or more threads having holds on said file.

49. The method of claim 47, wherein said invoking comprises calling said fast revoke routine on a thread currently servicing a request for said at least one token right.

50. A system of sharing data within a computing environment, said system comprising:

means for caching data in a first cache of said computing environment using a first protocol;

means for caching at least a portion of said data in a second cache of said computing environment using a second protocol, said second protocol being different from said first protocol; and means for providing cache consistency between said first cache and said second cache without modifying one or more clients, using at least one of said first protocol and said second protocol, to accommodate the protocol of the other of said first protocol and said second protocol, wherein a change to data common to said first cache and said second cache is reflected in said first cache and said second cache.

51. The system of claim 50, wherein said first protocol comprises using at least one opportunistic lock to cache data in said first cache.

52. The system of claim 51, wherein said means for caching data in said first cache comprises means for obtaining at least one token to represent said at least one opportunistic lock.

53. The system of claim 50, further comprising means for opening a file associated with said data, wherein said means for opening allows said file to be opened in one or more share modes.

54. The system of claim 53, wherein said one or more share modes are represented by one or more tokens used to manage said file.

55. The system of claim 53, wherein said means for caching data in a first cache includes a first client, said moans for caching data in a second cache includes a second client, and wherein said means for opening allows said file to be opened in one or more share modes, even though one of said first client and said second client does not support said one or more share modes.

56. The system of claim 55, further comprising means for masking said one or more share modes from said one of said first client and second client that does not support said one or more share modes.

57. The system of claim 50, further comprising a server token cache used when caching data in at least one o f said first cache and said second cache.

58. A system of sharing data within a computing environment, said system comprising:
   means for caching data in a first cache of said computing environment using a first protocol, said first protocol comprising using at least one opportunistic lock to cache data in said first cache, and wherein said means for caching data in said first cache comprises means for obtaining at least one token to represent said at least one opportunistic lock, wherein said means for obtaining comprises means for obtaining one or more lock token rights and one or more data/status token rights, which represent the at least one token of said at least one opportunistic lock;
   means for caching at least a portion of said data in a second cache of said computing environment using a second protocol, said second protocol being different from said first protocol; and
   means for providing cache consistency between said first cache and sa id second cache, wherein a change to data common to said first cache and said second cache is reflected in said first cache and said second cache.

59. The system of claim 58, further comprising means for obtaining one or more open token rights associated with said data, said one or more open token rights providing information used for obtaining at least one of said one or more lock token rights and said one on more data/status token rights.

60. A system of sharing data between clients of a computing environment said system comprising:
   a first client of said computing environment adapted to access a file of said computing environment, said first client having a first protocol; and
   a second client of said computing environment adapted to access said file, said second client having a second protocol said second protocol being different from said first protocol, and wherein a change to said file by one of said first client and said second client is reflected to the other of said first client and said second client without modifying at least one of the first client and the second client to accommodate the protocol of the other of the first client and the second client, thereby providing cache consistency.

61. The system of claim 60, further comprising a local user of said computing environment adapted to access said file.

62. The system or claim 60, wherein the accessing of said file by said first client and said second client does not require software changes to said first client or said second client.

63. The system of claim 60, wherein the accessing of said file by said first client and said second client does not require changes to an operating system of a server managing said first client and said second client.

64. The system of claim 60, wherein one or more token rights are associated with said file, and said system further comprises means for initiating revocation of at least one token right of said one or more token rights.

65. The system of claim 64, wherein said means for initiating revocation comprises:
   means for determining whether one or more predefined conditions are met; and
   means for invoking a fast revoke routine to attempt to revoke said at least one token right, when the one or more predefined conditions are not met.

66. The system of claim 65, wherein said one or more predefined conditions comprises at least one of a pending oplock break, a currently held oplock, and one or more threads having holds on said file.

67. The system of claim 65, wherein said means for invoking comprises means for calling said fast revoke routine on a thread currently servicing a request for said at least one token right.

68. The system of claim 60, further comprising means for masking one or more rights associated with one of said first client and said second client from the other of said first client and said second client.

69. The system of claim 60, wherein at least one client of said first client and said second client is remote from a server of the computing environment, and wherein said system further comprises means for obtaining at least one token right from a server token cache for one or more of said at least one client to be used in accessing said file.

70. The system of claim 60, further comprising at least one specific data structure used to represent said first client.

71. A system of sharing data between clients of a computing environment, said system comprising:
   means for opening a file, wherein said means for opening comprises means for performing a first phase to indicate that one or more rights associated with said open are pending grant and means for performing a second phase to indicate whether said opening is successful;
   a first client of said computing environment adapted to access said file, said first client having a first protocol; and
   a second client of said computing environment adapted to access said file, said second client having a second protocol, said second protocol being different from said first protocol, and wherein a change to said file by one of said first client and said second client is reflected to the other of said first client and said second client, thereby providing cache consistency.

72. A system of sharing data between clients of a computing environment, said system comprising:
   a first client of said computing environment adapted to access a file of said computing environment, said first client having a first protocol; and
   a second client of said computing environment adapted to access said file, said second client being represented by at least one specific data structure and said second client having a second protocol, said second protocol being different from said first protocol, and wherein a change to said file by one of said first client and said second client is reflected to the other of said first client and said second client, thereby providing cache consistency.

73. The system of claim 72, further comprising at least one specific data structure used to represent said first client.

74. The system of claim 72, further comprising at least one generic data structure used to represent said second client, said at least one generic data structure being capable of representing a plurality of clients.

75. The system of claim 74, further comprising means for obtaining one or more token rights of said file on behalf of the clients represented by said at least one generic data structure, said one or more token rights being usable in managing access to said file by said second client.

76. The system of claim 74, further comprising means for obtaining one or more token rights of said file on behalf of said second client represented by said specific data structure, rather than on behalf of said second client represented by said generic data structure.

77. At least one program storage device readable by a machine, tangibly embodying at least one program of instructions executable by the machine to perform a method of sharing data within a computing environment, said method comprising:

caching data in a first cache of said computing environment using a first protocol;

caching at least a portion of said data in a second cache of said computing environment using a second protocol, said second protocol being different from said first protocol; and providing cache consistency between said first cache and said second cache without modifying one or more clients, using at least one of the first protocol and the second protocol, to accommodate the protocol of the other of said first protocol and said second protocol, wherein a change to data common to said first cache and said second cache is reflected in said first cache and said second cache.

78. The at least one program storage device of claim 77, wherein said first protocol comprises using at least one opportunistic lock to cache data in said first cache.

79. The at least one program storage device of claim 78, wherein said caching data in said first cache comprises obtaining at least one token to represent said at least one opportunistic lock.

80. The at least one program storage device of claim 79, wherein said method further comprises:

determining whether an open of a file associated with said data has occurred that conflicts with granting of said at least one opportunistic lock; and deleting a hold on one or more tokens of said at least one token when the conflicting open has occurred, wherein said at least one opportunistic lock is not granted.

81. The at least one program storage device of claim 73, wherein said obtaining comprises obtaining one or more lock token rights and one or more data/status token rights, which represent the at least one token of said at least one opportunistic lock.

82. The at least one program storage device of claim 81, wherein said method further comprises obtaining one or more open token rights associated with said data, said one or more open token rights providing information used for obtaining at least one of said one or more lock token rights and said one or more data/status token rights.

83. The at least one program storage device of claim 77, wherein said method further comprises opening a file associated with said data, wherein said opening allows said file to be opened in one or more share modes.

84. The at least one program storage device of claim 83, wherein said one or more share modes are represented by one or more tokens used to manage said file.

85. At least one program storage device readable by a machine, tangibly embodying at least one program of instructions executable by the machine to perform a method of sharing data within a computing environment, said method comprising:

caching, by a first client, data in a first cache of said computing environment using a first protocol;

caching, by a second client, at least a portion of said data in a second cache of said computing environment using a second protocol, said second protocol being different from said first protocol;

providing cache consistency between said first cache and said second cache, wherein a change to data common to said first cache and said second cache is reflected in said first cache and said second cache; and wherein opening a file associated with said data allows said file to be opened in one or more share modes, even though one of said first client and said second client does not support said one or more share modes.

86. The at least one program storage device of claim 85, wherein said method further comprises masking said one or more share modes from said one of said first client and second client that does not support said one or more share modes.

87. At least one program storage device readable by a machine, tangibly embodying at least one program of instructions executable by the machine to perform a method of sharing data between clients of a computing environment, said method comprising:

accessing a file by a first client of said computing environment, said first client having a first protocol; and accessing said file by a second client of said computing environment, said second client having a second protocol, said second protocol being different from said first protocol, and wherein a change to said file by one of said first client and said second client is reflected to the other of said first client and said second client without modifying at least one of the first client and the second client to accommodate the protocol of the other of the first client and the second client, thereby providing cache consistency.

88. The at least one program storage device of claim 87, wherein said method further comprises opening said file, wherein said opening comprises performing a first phase to indicate that one or more rights associated with said open are pending grant and performing a second phase to indicate whether said opening is successful.

89. The at least one program storage device of claim 87, wherein said method further comprises representing said second client using at least one specific data structure for said second client.

90. The at least one program storage device of claim 89, wherein said method further comprises representing said second client using at least one generic data structure, said at least one generic data structure being capable of representing a plurality of clients.

91. The at least one program storage device of claim 85, wherein one or more token rights are associated with said fie, and said method further comprises initiating revocation of at least one token right of said one or mor token rights.

92. The at least one program storage device of claim 91, wherein said initiating revocation comprises:

determining whether one or more predefined conditions are met; and invoking a fast revoke routine to attempt to revoke said at least one token right, when the one or more predefined conditions are not met.

93. The at least one program storage device of claim 92, wherein said invoking comprises calling said fast revoke routine on a thread currently servicing a request for said at least one token right.

94. The at least one program storage device of claim 85, wherein said method further comprises masking one or more rights associated with one of said first client and said second client from the other of said first client and said second client.

95. The at least one program storage device of claim 85, wherein at least one client of said first client and said second client is remote from a server of the computing environment, and wherein said method further comprises obtaining at least one token right from a server token cache for one or more of said at least one client to be used in accessing said file.

96. At least one program storage device readable by a machine, tangibly embodying at least one program of instructions executable by the machine to perform a method of sharing data between clients of a computing environment, said method comprising:

accessing a file by a first client of said computing environment, said first client having a first protocol;

accessing said file by a second client of said computing environment, said second client being represented using at least one specific data structure for said second client and at least one generic data structure, said at least one generic data structure being capable of representing a plurality of clients;

obtaining one or more token rights of said file on behalf of the clients represented by said at least one generic data structure, said one or more token rights being usable in managing access to said file by said second client; and wherein said second client has a second protocol, said second protocol being different from said first protocol, and wherein a change to said file by one of said first client and said second client is reflected to the other of said first client and said second client, thereby providing cache consistency.

97. At least one program storage device readable by a machine, tangibly embodying at least one program of instructions executable by the machine to perform a method of sharing data between clients of a computing environment, said method comprising:

accessing a file by a first client of said computing environment, said first client having a first protocol;

accessing said file by a second client of said computing environment, said second client being represented using at least one specific data structure for said second client and at least one generic data structure, said at least one generic data structure being capable of representing a plurality of clients;

obtaining one or more token rights of said file on behalf of said second client represented by said specific data structure, rather than on behalf of said second client represented by said generic data structure; and wherein said second client has a second protocol, said second protocol being different from said first protocol, and wherein a change to said file by one of said first client and said second client is reflected to the other of said first client and said second client, thereby providing cache consistency.

* * * * *